United States Patent
Schliwa-Bertling et al.

(10) Patent No.: US 12,414,015 B2
(45) Date of Patent: Sep. 9, 2025

(54) 5G MULTICAST BROADCAST SERVICE HANDOVER

(71) Applicant: Telefonaktiebolaget LM Ericsson (publ), Stockholm (SE)

(72) Inventors: Paul Schliwa-Bertling, Ljungsbro (SE); Alexander Vesely, Feldbach (AT); Hans Bertil Rönneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 254 days.

(21) Appl. No.: 17/927,017

(22) PCT Filed: May 20, 2021

(86) PCT No.: PCT/IB2021/054392
§ 371 (c)(1),
(2) Date: Nov. 22, 2022

(87) PCT Pub. No.: WO2021/234635
PCT Pub. Date: Nov. 25, 2021

(65) Prior Publication Data
US 2023/0362740 A1    Nov. 9, 2023

Related U.S. Application Data

(60) Provisional application No. 63/029,116, filed on May 22, 2020.

(51) Int. Cl.
*H04W 36/00* (2009.01)
(52) U.S. Cl.
CPC ... *H04W 36/0007* (2018.08); *H04W 36/0016* (2013.01)

(58) Field of Classification Search
CPC ..... H04W 36/00; H04W 36/08; H04W 36/02; H04W 36/16; H04W 36/32; H04W 4/06;
(Continued)

(56) References Cited

U.S. PATENT DOCUMENTS 9,173,192 B2 * 10/2015 Zhang .................... H04W 72/30
10,172,113 B2 * 1/2019 Zhang .................... H04W 48/20
(Continued)

FOREIGN PATENT DOCUMENTS

CN    101150852 A    3/2008
EP    3557905 A1    10/2019
(Continued)

OTHER PUBLICATIONS

Author Unknown, "Technical Specification Group Services and System Aspects; Multimedia Broadcast/Multicast Service (MBMS); Architecture and functional description (Release 16)," Technical Specification 23.246, Version 16.1.0, Sep. 2019, 3GPP Organizational Partners, 77 pages.
(Continued)

*Primary Examiner* — Man U Phan
(74) *Attorney, Agent, or Firm* — Withrow & Terranova, PLLC

(57) ABSTRACT

Systems and methods for session continuity of Multicast Broadcast (MB) Sessions are provided. In some embodiments, a method performed by a base station for session continuity of MB Sessions includes at least one of: providing at least one MB Session to a wireless device connected in 5G; determining that the wireless device is handed over to a target Next Generation Radio Access Network (NG-RAN); and providing session continuity of the at least one MB Session to the wireless device. In some embodiments, being handed over to the target NG-RAN comprises an Xn handover. In some embodiments, being handed over to the
(Continued)

target NG-RAN comprises a N2 handover. Some embodiments of the current disclosure provide support for Multicast Broadcast Session continuity (aka "Handover") at Inter-gNB Xn Handover and Inter-gNB N2 Handover in the 5G NR radio access.

17 Claims, 14 Drawing Sheets

(58) Field of Classification Search
CPC ..... H04W 72/04; H04W 72/30; H04W 76/40; H04W 76/27; H04W 76/22; H04W 76/11; H04W 76/34; H04W 68/00; H04W 4/08; H04W 12/03; H04W 12/04; H04L 12/18; H04L 12/26; H04L 12/85; H04L 12/12; H04L 12/89; H04L 43/02; H04L 9/08; H04L 9/14; H04L 29/06; H04L 27/00
USPC ......................................................... 370/331
See application file for complete search history.

(56) References Cited

U.S. PATENT DOCUMENTS

| | | | | |
|---|---|---|---|---|
| 10,542,428 | B2* | 1/2020 | Ben Henda | H04W 12/041 |
| 11,122,427 | B2* | 9/2021 | Ohlsson | H04L 9/0866 |
| 11,606,734 | B2* | 3/2023 | Park | H04W 36/0033 |
| 11,683,855 | B2* | 6/2023 | Ayaz | H04L 65/611 |
| | | | | 370/312 |
| 11,722,933 | B2* | 8/2023 | Xu | H04W 28/02 |
| | | | | 370/331 |
| 11,871,291 | B2* | 1/2024 | Shan | H04W 76/12 |
| 11,962,999 | B2* | 4/2024 | Baskaran | H04W 12/0431 |
| 12,010,591 | B2* | 6/2024 | Ayaz | H04W 4/06 |
| 12,137,380 | B2* | 11/2024 | Nakarmi | H04W 48/16 |
| 12,143,883 | B2* | 11/2024 | Xu | H04W 36/0044 |
| 2018/0035340 | A1 | 2/2018 | Fujishiro et al. | |
| 2020/0120570 | A1* | 4/2020 | Youn | H04W 8/08 |

FOREIGN PATENT DOCUMENTS

| | | |
|---|---|---|
| WO | 2012148206 A2 | 11/2012 |
| WO | 2016163547 A1 | 10/2016 |
| WO | 2019053185 A1 | 3/2019 |
| WO | 2020035129 A1 | 2/2020 |
| WO | 2021175411 A1 | 9/2021 |
| WO | 2021191802 A1 | 9/2021 |
| WO | 2021224296 A1 | 11/2021 |

OTHER PUBLICATIONS

Author Uknown, "Technical Specification Group Services and System Aspects; Group Communication System Enablers for LTE (GCSE_LTE); Stage 2 (Release 15)," Technical Specification 23.468, Version 15.1.0, Sep. 2019, 3GPP Organizational Partners, 32 pages.
Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.
Author Unknown, "Technical Specification Group Services and System Aspects; Procedures for the 5G System (5GS); Stage 2 (Release 16)," Technical Specification 23.502, Version 16.4.0, Mar. 2020, 3GPP Organizational Partners, 582 pages.
Author Unknown, "Technical Specification Group Services and System Aspects; Study on architectural enhancements for 5G multicast-broadcast services (Release 17)," Technical Specification 23.757, Version 0.3.0, Jan. 2020, 3GPP Organizational Partners, 37 pages.
Author Unknown, "Technical Specification Group Services and System Aspects; Study on architecture enhancements for the Evolved Packet System (EPS) and the 5G System (5GS) to support advanced V2X services (Release 16)," Technical Report 23.786, Version 16.1.0, Jun. 2019, 3GPP Organizational Partners, 119 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Technical Specification 36.300, Version 16.1.0, Mar. 2020, 3GPP Organizational Partners, 386 pages.
Author Unknown, "Technical Specification Group Radio Access Network; NR; NR and NG-RAN Overall Description; Stage 2 (Release 16)," Technical Specification 38.300, Version 16.1.0, Mar. 2020, 3GPP Organizational Partners, 133 pages.
Author Unknown, "Technical Specification Group Radio Access Network; NR; Layer 2 Measurements (Release 16)," Technical Specification 38.314, Version 0.2.0, May 2020, 3GPP Organizational Partners, 20 pages.
Author Unknown, "Technical Specification Group Radio Access Network; NG-RAN; NG Application Protocol (NGAP) (Release 16)," Technical Specification 38.413, Version 16.1.0, Mar. 2020, 3GPP Organizational Partners, 341 pages.
Ericsson, "S2-2004969: KI#7, Update to Sol# 11 & 12," 3GPP SA WG2 Meeting #140E, Aug. 19-Sep. 2, 2020, Electronic Meeting, 10 pages.
International Search Report and Written Opinion for International Patent Application No. PCT/IB2021/054392, mailed Sep. 1, 2021, 17 pages.
International Preliminary Report on Patentability for International Patent Application No. PCT/IB2021/054392, mailed Apr. 21, 2022, 22 pages.
Ericsson, "R2-2005169: Clarification of DAPS configuration in MR-DC," 3GPP TSG-RAN WG2 #110-e, Jun. 1-12, 2020, Electronic Meeting, 3 pages.
Ericsson, "S2-2003680: KI #1, New Sol: Xn Handover of MB Sessions," 3GPP SA WG2 Meeting #139E, Jun. 1-12, 2020, Electronic Meeting, 5 pages.
Ericsson, "S2-2003681: KI #1, New Sol: N2 Handover of MB Sessions," 3GPP SA WG2 Meeting #139E, Jun. 1-12, 2020, Electronic Meeting, 10 pages.
Notice of Reasons for Refusal for Japanese Patent Application No. 2022-570455, mailed Mar. 26, 2024, 12 pages.
Ericsson, "S2-2001542: Key Issue Optimized radio resource for MBS service and Solution," 3GPP SA WG2 Meeting #136AH, Jan. 13-17, 2020, Incheon, Korea, 4 pages.
Notice of Reasons for Rejection for Japanese Patent Application No. 2022-570455, mailed Sep. 10, 2024, 14 pages.
Extended European Search Report for European Patent Application No. 24178416.4, mailed Oct. 17, 2024, 13 pages.
Decision of Refusal for Japanese Patent Application No. 2022-570455, mailed Feb. 25, 2025, 11 pages.
Ericsson, "S2-200-200xxxx: Solution 2 update," 3GPP SA WG2 Meeting #138E, Jun. 1-12, 2020, Electronic Meeting, 14 pages.
Oppo, "S2-20xxxx: Solution for lossless multicast and unicast switching," 3GPP SA WG2 Meeting #136AH, Jan. 13-17, 2020, Incheon, Korea, 4 pages.
First Office Action for Chinese Patent Application No. 202180036769.7, mailed Apr. 19, 2025, 17 pages.
Apple, "S2-20xxxx: Solution for Key Issue #7: Reliable delivery mode switching between uncast and multicast," 3GPP SA WG2 Temporary Document, May 12, 2020, Electronic Meeting, 4 pages.
Notice of Submission of Opinions for Korean Patent Application No. 10-2022-7043526, mailed Jun. 19, 2025, 16 pages.

* cited by examiner

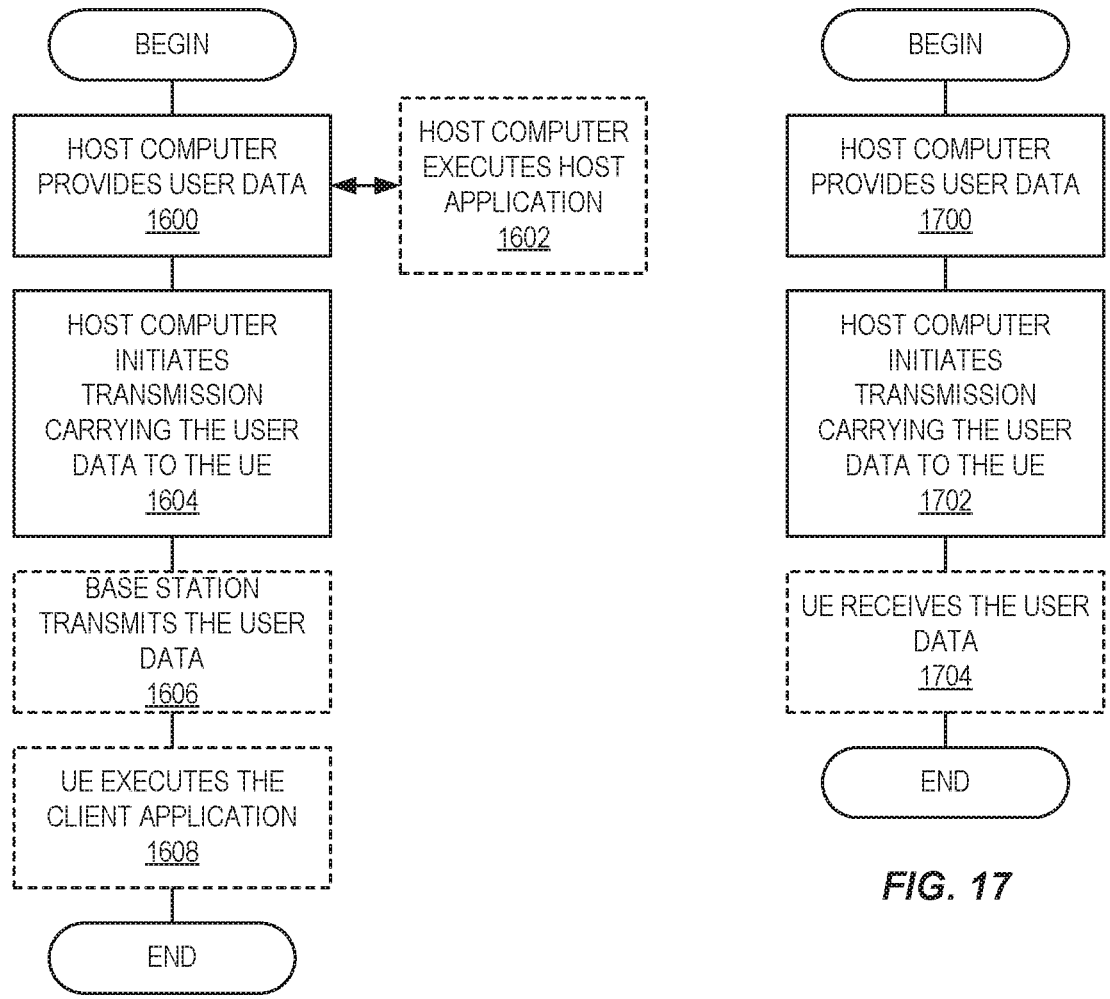

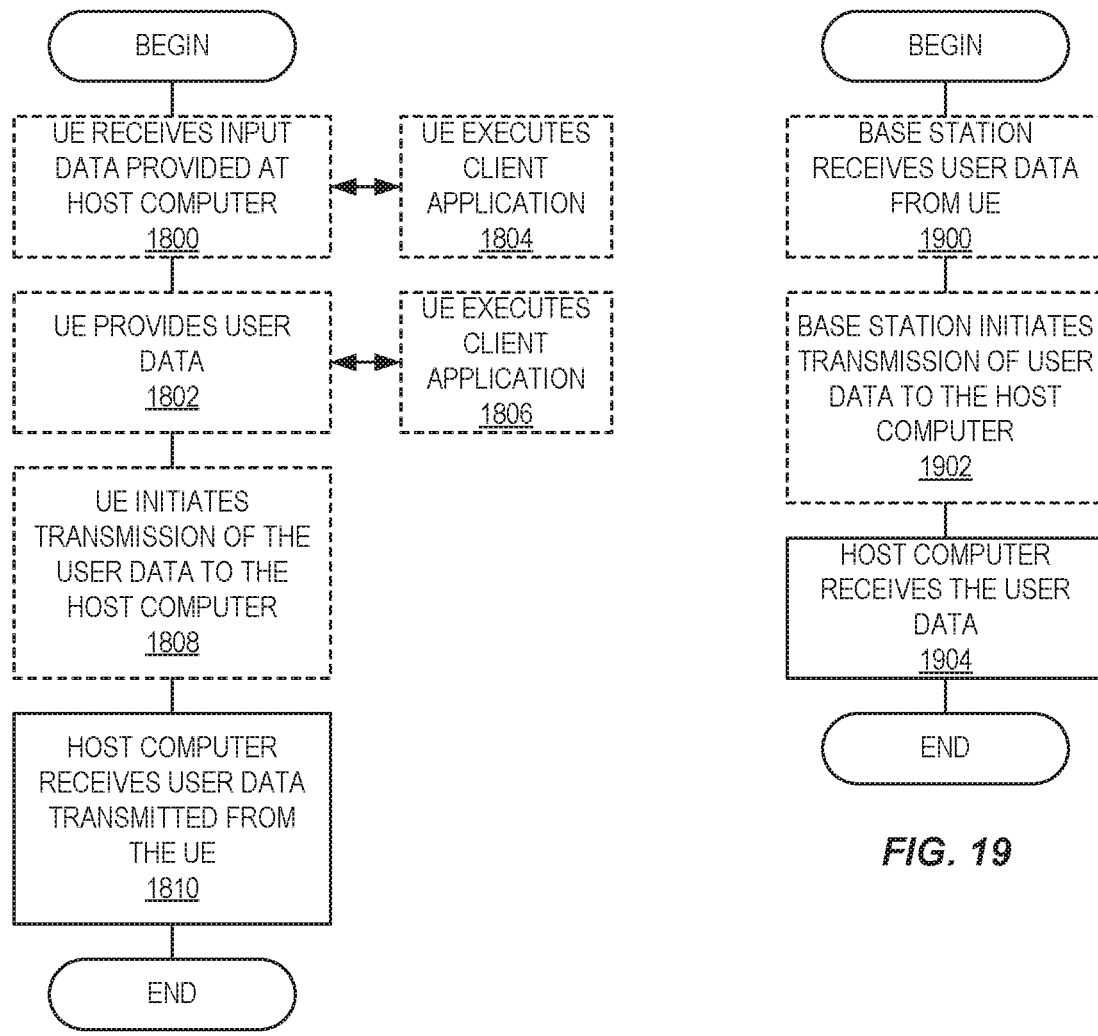

5G MULTICAST BROADCAST SERVICE HANDOVER

RELATED APPLICATIONS

This application claims the benefit of provisional patent application Ser. No. 63/029,116, filed May 22, 2020, the disclosure of which is hereby incorporated herein by reference in its entirety.

TECHNICAL FIELD

The present disclosure relates to multicast broadcast sessions.

BACKGROUND

The 3rd Generation Partnership Project (3GPP) has earlier developed the Multicast/Broadcast Multimedia Subsystem (MBMS) (see 3GPP TS 23.246 v16.1.0) for 3G networks for video multicast/broadcasting and streaming services and later introduced the evolved MBMS (eMBMS) for Evolved Packet System (EPS). In Rel-13 and Rel-14, the MBMS system has been updated to support new services such as Public Safety, Cellular Internet of Things (CIoT), and Vehicle to Everything (V2X).

The scope of a new Release-17 study in 3GPP SA2 working group is to study both multicast requirements and use cases for CIoT, Public Safety, V2X etc., and dedicated broadcasting requirements and use cases. The study targets the 5G Release 17 and the New Radio (NR) radio access. The study results so far has been documented in the TR 23.757 V0.3.0.

There currently exist certain challenge(s). Multicast/Broadcast services are so far not supported on 5G NR. With the enhanced characteristics of the 5G NR e.g., short delays, bandwidth etc., it is believed Mission Critical Services (Mission Critical Push To Talk (MCPTT), Mission Critical Data (MCData), and Mission Critical Video (MCVideo), as well as VTX services, will show an enhanced and much better performance on 5G NR.

For 5G MBS Multicast support, the 5G System (5GS) must support UE mobility. Session continuity during Handover (i.e., Xn Handover and N2 Handover) is a requirement. The existing procedures in TS 23.502 v16.4.0 clause 4.9.1.2 "Xn based inter NG-RAN handover" and clause 4.9.1.3 "Inter NG-RAN node N2 based handover" need to be enhanced to support 5MBS and MB Sessions during Handover. The 5MBS study is documented in TR 23.757 V0.3.0, but so far no solutions on Handover have been documented. Improved systems and methods for session continuity of MB Sessions are needed.

SUMMARY

Systems and methods for session continuity of MB Sessions are provided. In some embodiments, a method performed by a base station for session continuity of Multicast Broadcast (MB) Sessions includes at least one of: providing at least one MB Session to a wireless device connected in 5G; determining that the wireless device is handed over to a target Next Generation Radio Access Network (NG-RAN); and providing session continuity of the at least one MB Session to the wireless device.

In some embodiments, being handed over to the target NG-RAN comprises an Xn handover. In some embodiments, being handed over to the target NG-RAN comprises a N2 handover.

Some embodiments of the current disclosure provide support for Multicast Broadcast Session continuity (aka "Handover") at Inter-gNB Xn Handover and Inter-gNB N2 Handover in the 5G NR radio access.

In some embodiments, a method performed by a base station for session continuity of MB Sessions includes at least one of: providing at least one MB Session to a wireless device connected in 5G; determining that the wireless device is handed over to a target Next Generation Radio Access Network, NG-RAN; and providing session continuity of the at least one MB Session to the wireless device.

In some embodiments, a method performed by a base station for session continuity of MB Sessions, the method comprising at least one of: receiving a handed over wireless device that was receiving at least one MB Session; and providing session continuity of the at least one MB Session to the wireless device.

In some embodiments, the method also includes causing resources to be established in the Target NG-RAN in the Xn Handover preparation phase. In some embodiments, the method also includes causing resources to be established in the Target NG-RAN in the Xn Handover execution phase.

In some embodiments, the method also includes notifying and/or triggering an Access and Mobility Management Function, AMF, to start setup of MB Session resources in the NG-RAN. In some embodiments, the notifying and/or triggering comprises a MB Session Command. In some embodiments, the notifying and/or triggering comprises new parameters to an existing Path Switching Request and/or Path Switching Request Acknowledgement messages.

In some embodiments, a new parameter "Temporary Mobile Group Identities, TMGIs" (or TMGI-list) is included in the existing Path Switch Request message.

In some embodiments, being handed over to the target NG-RAN comprises a N2 handover.

In some embodiments, the method also includes causing resources to be established in the Target NG-RAN in the N2 Handover preparation phase.

In some embodiments, the method also includes releasing resources if this was the last wireless device leaving that MB Session.

Certain aspects of the present disclosure and their embodiments may provide solutions to the aforementioned or other challenges. Specific parts of the 5MBS procedures are covered in other disclosures. Some disclosures cover 5MBS Radio Access Network-Fifth Generation Core (RAN-5GC) interactions. Application PCT/EP2020/055482 covers Access and Mobility Management Function (AMF) Service Discovery for MB-a Session Management Function (SMF).

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 16-19 are flowcharts illustrating methods implemented in a communication system, according to some embodiments of the present disclosure.

DETAILED DESCRIPTION

Figure 1:
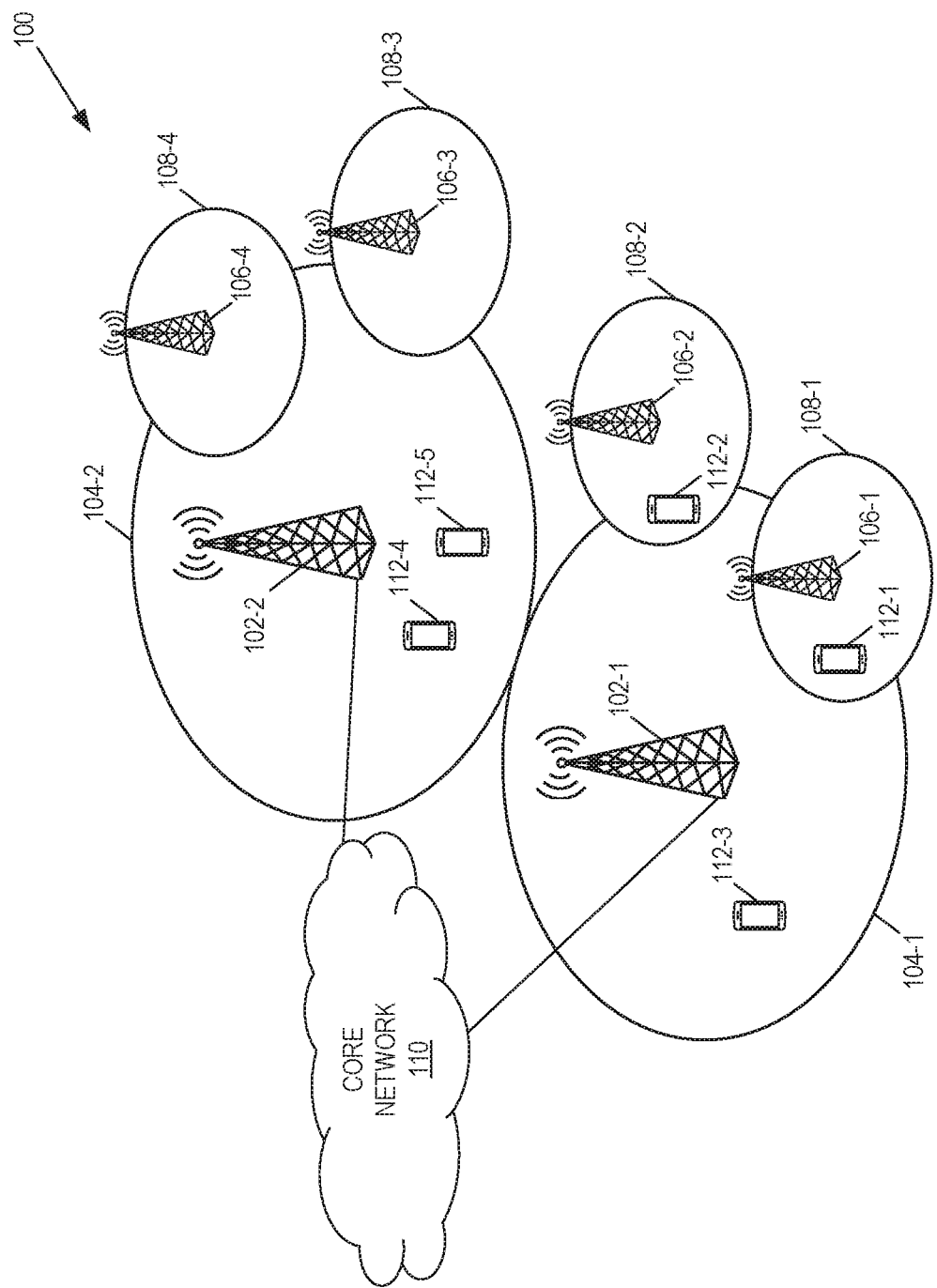
FIG. 1 illustrates one example of a cellular communications system 100 in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC). In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
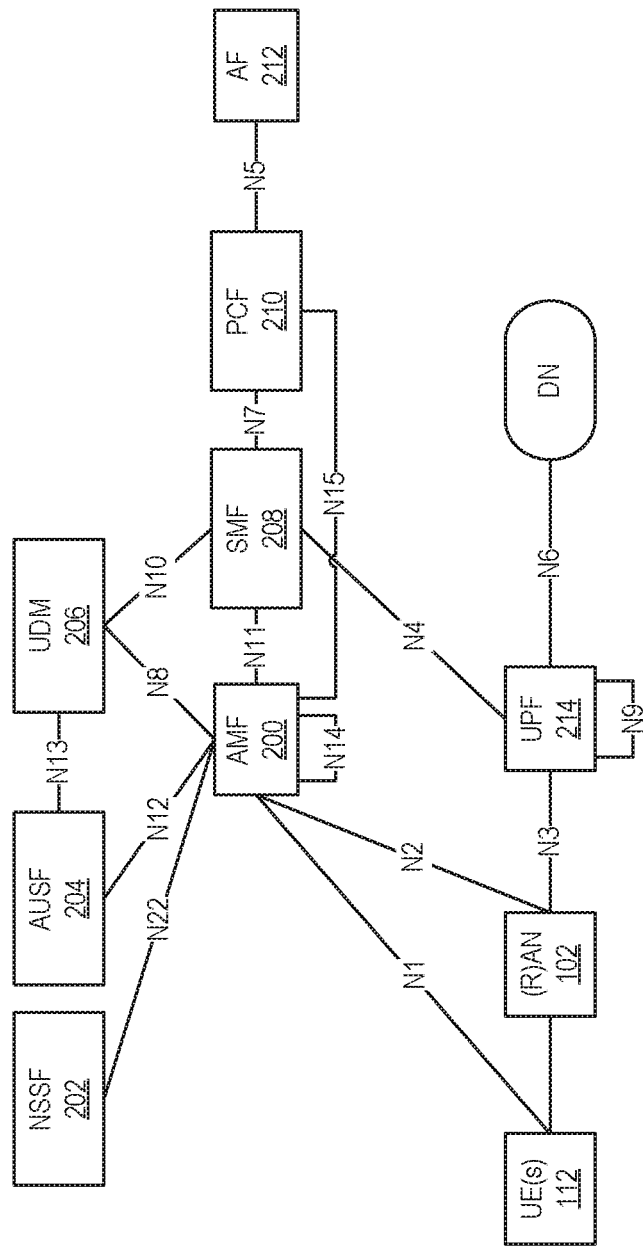
FIG. 2 illustrates a wireless communication system represented as a 5G network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g., such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
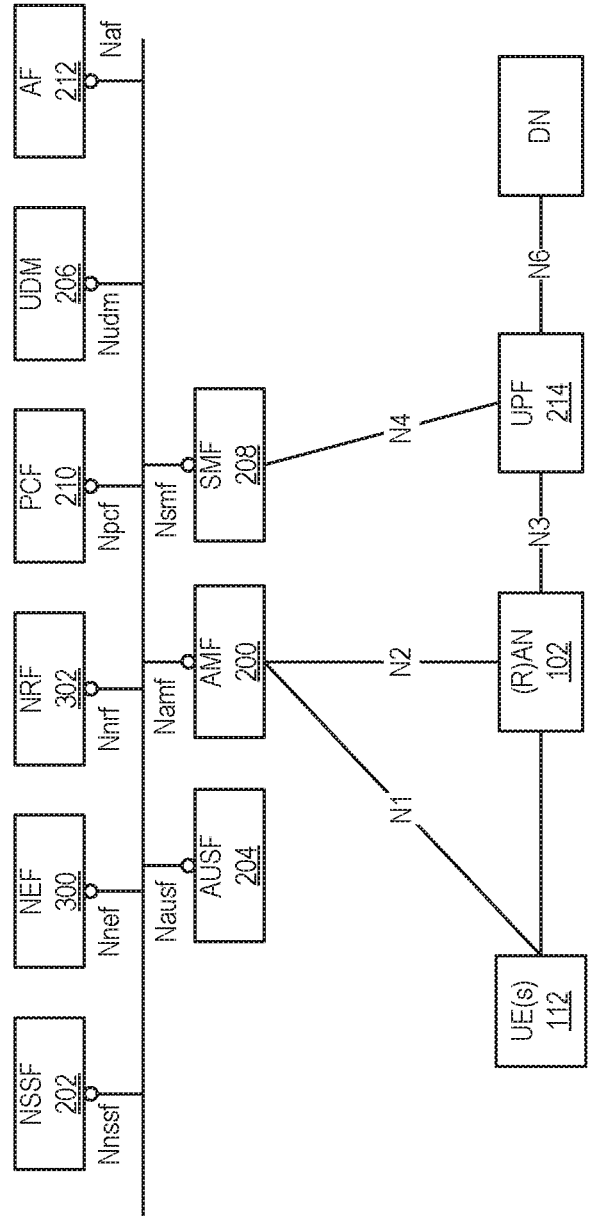
FIG. 3 illustrates a 5G network architecture using service-based interfaces between the NFs in the CP, instead of the point-to-point reference points/interfaces used in the 5G network architecture of FIG. 2

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g., Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

For 5G MBS Multicast support, the 5G System (5GS) must support UE mobility. Session continuity during Handover (i.e., Xn Handover and N2 Handover) is a requirement. The existing procedures in TS 23.502 v16.4.0 clause 4.9.1.2 "Xn based inter NG-RAN handover" and clause 4.9.1.3 "Inter NG-RAN node N2 based handover" need to be enhanced to support 5MBS and MB Sessions during Handover. The 5MBS study is documented in TR 23.757 V0.3.0, but so far no solutions on Handover have been documented. Improved systems and methods for session continuity of MB Sessions are needed.

Systems and methods for session continuity of Multicast Broadcast (MB) Sessions are provided. In some embodiments, a method performed by a base station for session continuity of MB Sessions includes at least one of: providing at least one MB Session to a wireless device connected in 5G; determining that the wireless device is handed over to a target Next Generation Radio Access Network (NG-RAN); and providing session continuity of the at least one MB Session to the wireless device. In some embodiments, being handed over to the target NG-RAN comprises an Xn handover. In some embodiments, being handed over to the target NG-RAN comprises a N2 handover. Some embodiments of the current disclosure provide support for Multicast Broadcast Session continuity (aka "Handover") at Inter-gNB Xn Handover and Inter-gNB N2 Handover in the 5G NR radio access.

The present disclosure has two broad categories of embodiments: 5MBS Xn Handover and 5MBS N2 Handover. Details on some implementations of these embodiments are included below.

Certain embodiments may provide one or more of the following technical advantage(s). Advantages of Xn embodiments:

Enhanced the 5G Xn Handover procedure (TS 23.502 v16.4.0 clause 4.9.1.2) to support session continuity (i.e., "handover") of 5G MB Sessions.

Resources in Target NG-RAN are established already in the Xn Handover preparation phase (see step 2 description of "Option 1"). This means that immediately when the UE switches to the new cell in Target NG-RAN, the UE can start to receive the 5MBS media stream in the new cell. That is, service continuity characteristics will be excellent and the gap in reception of media a minimum or none.

Resources in Target NG-RAN may optionally be established in the Xn Handover Execution phase (see step 10 description of "Option 2"). This Option 2 may be an alternative way to do it, but it may also be a complementary way to do it, e.g., when moving from a Source NG-RAN that does not support 5MBS to a Target NG-RAN that do support 5MBS, or for better system robustness. With option 2 service continuity characteristics (i.e., gap in media reception) will be slightly worse, but might still be acceptable for most use cases.

New message MB Session Command (TMGIs) in step 2a, by which the NG-RAN notifies and triggers the AMF to start setup of MB Session resources in the NG-RAN.

Enhancements with new parameters to the existing Path Switching Request and Path Switching Request Acknowledgement messages (step 9) may reduce signaling between AMF and NG-RAN (step 10a/message MB Session Join may be replaced by adding new corresponding parameters (NGAP ID & TMGI) into the Path Switch Request Acknowledgement message.

Furthermore, inclusion of the new parameter "TMGIs" (or TMGI-list) into the existing Path Switch Request message can make AMF aware if NG-RAN already knows that the UE has joined the MB Session, in which case MB Session Join step 10a is not required.

Release of resources in the Source NG-RAN node if this was the last UE leaving that MB Session in that node (step 8)

Advantages of N2 embodiments:

Enhanced the 5G N2 Handover procedure (TS 23.502 v16.4.0 clause 4.9.1.3) to support session continuity (i.e., "handover") of 5G MB Sessions.

Resources in T-NG-RAN are established already in the N2 Handover Preparation phase. This means that immediately in the Execution phase when the UE switches to the new cell in T-NG-RAN (i.e., in step 4), the UE can start to receive the 5MBS media stream in the new cell. That is, service continuity characteristics will be excellent and the gap in reception of media a minimum or none.

Release of resources in the S-NG-RAN node if this was the last UE leaving that MB Session in that node (step 14 c in clause 4.9.1.3.3).

Figure 4:
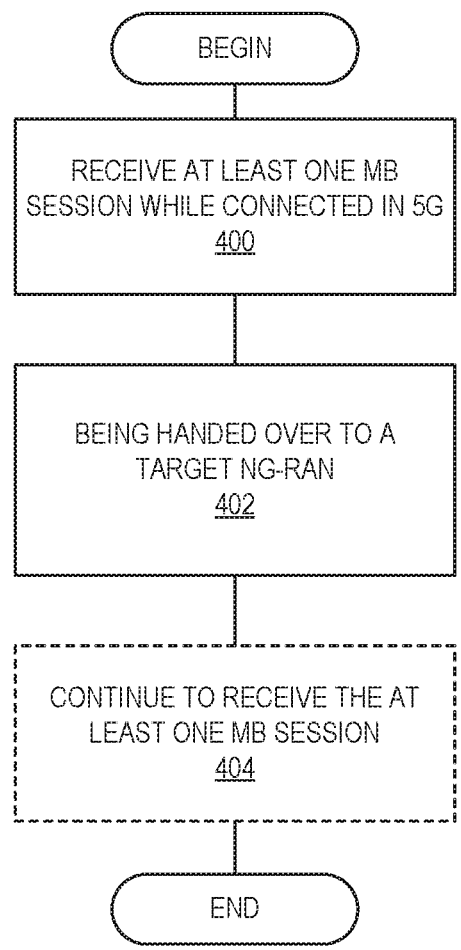
FIG. 4 illustrates a method performed by a wireless device for session continuity of MB Sessions, according to some embodiments of the current disclosure.

FIG. 4 illustrates a method performed by a wireless device for session continuity of MB Sessions, according to some embodiments of the current disclosure. In some embodiments, the method includes at least one of: receiving at least one MB Session while connected in 5G (step 400); being handed over to a target NG-RAN (step 402); and optionally continuing to receive the at least one MB Session (404).

Figure 5:
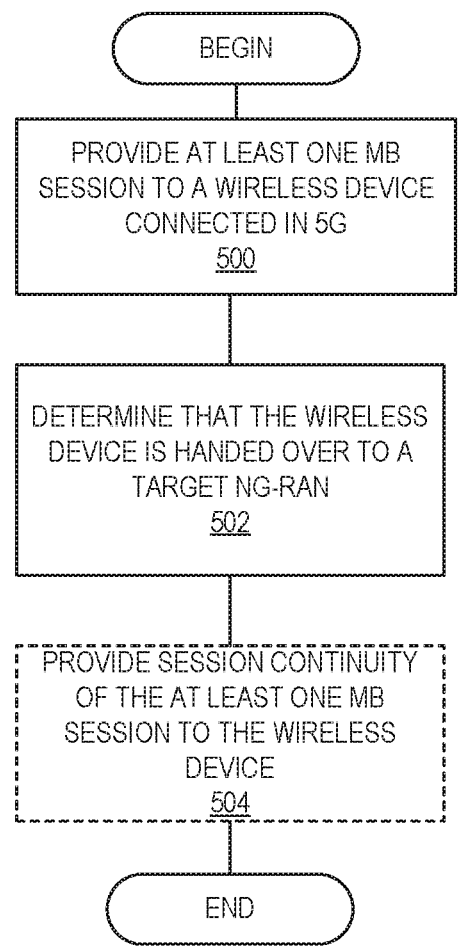
FIG. 5 illustrates a method performed by a base station for session continuity of MB Sessions, according to some embodiments of the current disclosure.

FIG. 5 illustrates a method performed by a base station for session continuity of MB Sessions, according to some embodiments of the current disclosure. In some embodiments, the method includes at least one of: providing at least one MB Session to a wireless device connected in 5G (step 500); determining that the wireless device is handed over to a target NG-RAN (step 502); and optionally providing session continuity of the at least one MB Session to the wireless device (step 504).

In this way, some embodiments provide support for Multicast Broadcast Session continuity (aka "Handover") at Inter-gNB Xn Handover and Inter-gNB N2 Handover in the 5G NR radio access.

In some embodiments, there is an Xn Handover of MB Sessions. Note that, in some embodiments, the 5G MB Sessions are not strictly handed over since they are shared. PDU Sessions are not shared and are handed over. In some embodiments, MB Sessions are started in the Target Cell (if not already active and used by other UEs in that cell) and, in some embodiments, MB Sessions are Released in the Source Cell (e.g., if this was the last UE listening to that MB Session in that cell).

Some embodiments describe Xn Handover of MB Sessions for NR. Xn Handover between RATs is not supported (e.g., between NR and E-UTRA). Instead session continuity is assumed to be handled on the application level, e.g., as is described in TS 23.468 clause 5.3 "Service Continuity".

The message names in the procedure below are descriptive. It is assumed that the names are updated with corresponding SBI based names where applicable during the normative phase. N2, N3 messages are dependent on RAN3 decisions.

For Inter-gNB Xn Handover: The Target NG-RAN triggers 5GC to establish any MB Session resources that need to be established (see option 1 below) in the course of Xn Handover preparation phase, prior to handover execution phase. The UE would continue to receive the media stream immediately when it has synchronized to the new cell. This enables MB Session continuity.

Alternatively, the AMF may take responsibility for the MB Session resource setup in Target NG-RAN (see option 2 below) after the UE was handed over to the Target NG-RAN. Parameters in the Path Switch Request/Response messages may provide some optimization. This option would result in a somewhat bigger gap in the MB session continuity, assuming that UE-individual data forwarding is not applied of MB Session user data.

In some embodiments, during an Xn Handover, the PDU Sessions of a UE are moved and connected to the new NG-RAN node. Unlike PDU Session, MB Sessions are never moved and connected to the Target NG-RAN node. Transfer of data associated with MB Sessions is started on the Target NG-RAN node and if needed released on the Source NG-RAN node.

For the full sequence of the Xn Handover procedure, please refer to clause 4.9.1.2 in TS 23.502 [x] and clause 9.2.3 in TS 38.300 [y].

Figure 6:
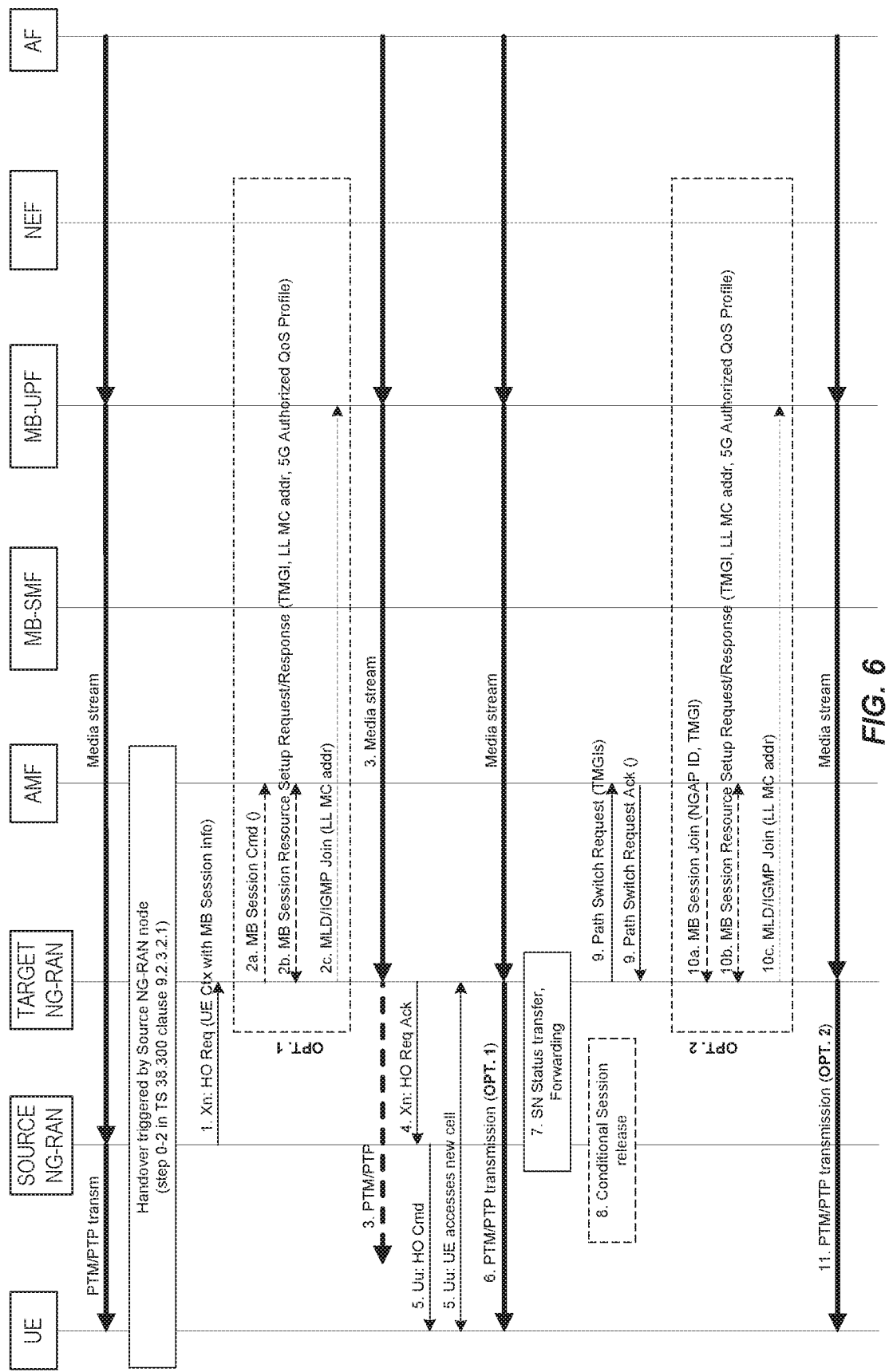
FIG. 6 illustrates example embodiments for inter-gNB Xn handover, according to some embodiments of the current disclosure.

FIG. 6 illustrates example embodiments for inter-gNB Xn handover, according to some embodiments of the current disclosure.

0. A Media stream to the Source NG-RAN and PTM/PTP transmission to the UE is ongoing. Source NG-RAN triggers a Handover (see step 0 to 2 in clause 9.2.3.2.1, TS 38.300 [x]).

1. Source NG-RAN sends an Xn Handover Request ( ) to Target NG-RAN. The UE Context contains MB Session information.

2. OPTION 1: Source NG-RAN informs Target NG-RAN of any MB Session resources that need to be established. MB Session Info for the MB Sessions the UE has joined is included in the Xn Handover Request message, with a list of {TMGI, active/inactive indicator, LL MC address}. In some embodiments, a Temporary Mobile Group Identity (TMGI) is a radio resource efficient mechanism for identifying an MBMS Bearer Service (as opposed to using the IP Multicast Address and Access Point Name).

If option 1 is used and Target NG-RAN does not already have an active MB Session Ctx for any TMGIs in the list in step 1:

2a. The Target NG-RAN announces its interest in the MB Session by sending a MB Session Command (TMGIs) to the AMF.

2b. If an MB Session is set to active state above, the AMF sends an MB Session Resource Setup Request (TMGI, LL MC, 5G Authorized QoS Profile) message to the NG-RAN node. The NG-RAN creates an MB Session Ctxt (if it does not already exist), sets it to active state, stores the TMGI, the 5G Authorized QoS Profile and the AMF ID in the MB Session Ctx. The NG-RAN node returns an MB Session Resource Setup Response (TMGI) message to the AMF when resources have successfully been established. The AMF stores the NG-RAN ID of the Target NG-RAN node in the AMF MB Session Ctx.

2c. The Target NG-RAN joins the multicast group (i.e., LL MC address) for new active MB Sessions.

3. For active MB Sessions, resources may be configured for the UE that is handed over from source to target to transmit media streams by the Target NG-RAN. If there are already other UEs joined to the active MB Session in the Target NG-RAN, PTM/PTP transmissions are also ongoing.

4. The Target NG-RAN sends an Xn Handover Request Acknowledge ( ) to Source NG-RAN.

5. The Source NG-RAN sends a Uu Handover Command ( ) to the UE. The UE starts to access and synchronizes to the new cell.

6. The Target NG-RAN determines that the new UE in the cell should receive media for one or more MB Sessions and provides PTM/PTP transmission(s) to the new UE. In some embodiments, optionally the data transfer to the UE on PTM can be already started in step 3. RAN to determine.

7. SN Status is transferred to the Target NG-RAN, however not for MB Sessions. Forwarding for PDU Sessions may be performed.

8. [Conditional] If this UE was the last UE to leave a MB Session in the Source NG-RAN, the Source NG-RAN releases its resources for the MB Session (see Session Leave procedure).

9. Target NG-RAN sends a Path Switch Request (TMGIs) message to the AMF. If the Target NG-RAN is aware of TMGIs the UE has joined, they may be included in the request message. The AMF responds with a Path Switch Request Acknowledge ( ) message.

In some embodiments, RAN may decide to introduce a TMGI list parameter in the Path Switch Request Acknowledge ( ) message to replace step 10a below.

10. OPTION 2: AMF determines if MB Session resources need to be setup in Target NG-RAN e.g., by checking if the NG-RAN ID of the Target NG-RAN node is already stored in the AMF MB Session Ctx or not, and the state of the MB Session Ctx. If active state and not stored, steps 10a to 10c are executed.

10a. When AMF receives the Path Switch Request 0 message, the AMF sends a MB Session Join (NGAP ID, TMGI) message to Target NG-RAN for each TMGI the AMF has in its UE Context, unless the Target NG-RAN is already aware due to option 1 (as indicated by the presence of the TMGI in the Path Switch Request message), then no MB Session Join message is sent.

10b. If any of the TMGIs in the AMF UE Context has a MB Session Ctx in active state and the AMF has not already requested the Target NG-RAN node to make resource setup, the AMF sends MB Session Resource Setup Request (TMGI, LL MC, 5G Authorized QoS Profile) message to the Target NG-RAN.

10c. If a MB Session Ctx for the TMGI does not already exist in Target NG-RAN, the NG-RAN creates a MB Session Ctx, sets it to active state, stores the TMGI, the QoS Profile and a list of AMF IDs in the MB Session Ctx and joins the multicast group (i.e., LL MC address). Otherwise Target NG-RAN just stores the AMF ID in its MB Session Ctx.

11. If there is MB Session Ctx in active state for any of the TMGI(s) of the new UE in the Target NG-RAN, the Target NG-RAN provides PTM/PTP transmission(s) to the new UE if not already done (in step 6).

In some embodiments, support for Option 1 above is a RAN decision. Option 1 may provide much better session continuity characteristics at handover and reduce N2 signaling. In some embodiments, support for the TMGI parameter in the Path Switch Request message is a RAN decision. It may reduce N2 Session Join signaling in step 10a when Option 1 is used. In some embodiments, support for TMGI-list parameter in the Path Switch Request Acknowledge message is a RAN decision. It may reduce N2 Session Join signaling in step 10a. If RAN decides for this TMGI-list parameter, the parameter in the Note above may not be required. In some embodiments, Option 1 and Option 2 can be complementary and may both be standardized depending on RAN decision.

In some embodiments, there might be various impacts on services, entities and interfaces such as:
- UE: —Reception of multicast data using PTM/PTP in RRC Connected. —Switch of reception from Source to Target NG-RAN when Xn Handover execution phase commences.
- NG-RAN: —Support for MB Session info in Xn Handover request (option 1). —MB Session resource setup during Xn Handover preparation phase (option 1). —MB Session resource setup during Xn Handover execution phase (option 2). —New parameters in Patch Switch messages.
- AMF: —Support new message which triggers MB Session resource setup in NG-RAN during Xn Handover preparation phase (option 1).

In this way, some embodiments provide support for Multicast Broadcast Session continuity (aka "Handover") at Inter-gNB Xn Handover and Inter-gNB N2 Handover in the 5G NR radio access.

In some embodiments, the handover occurs via a N2 handover. During the N2 Handover preparation phase, the Source NG-RAN triggers 5GC to establish any MB Session resources that need to be established. The UE would continue to receive the media stream immediately when it has synchronized to the new cell. This enables MB Session continuity.

The N2 Handover solution is shown on top of the TS 23.502 N2 Handover procedure in clause 4.9.1.3. Proposed changes are shown below as bold in some cases.

Figure 7:
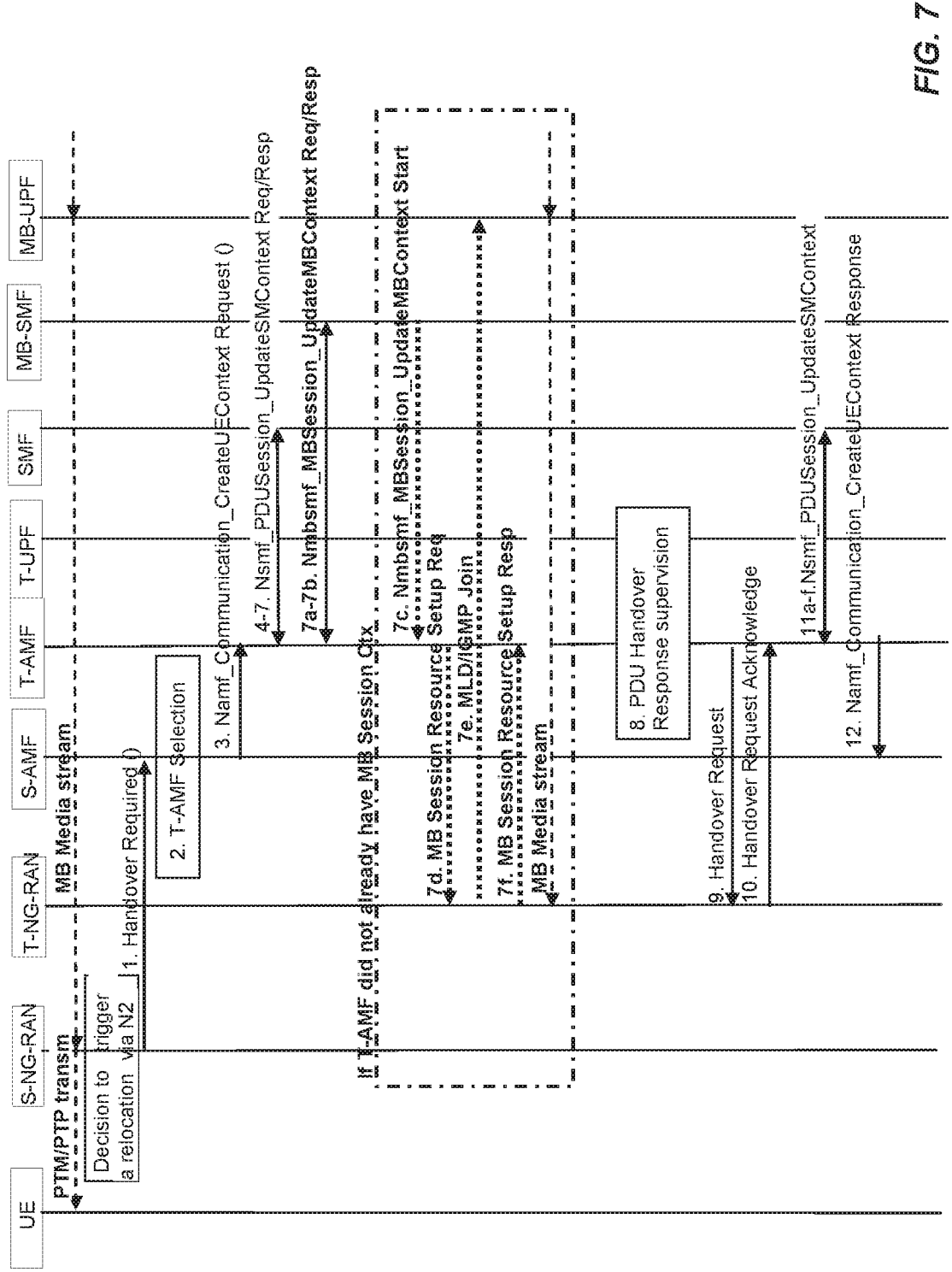
FIG. 7 illustrates example embodiments for inter-NG RAN node N2 based handover, according to some embodiments of the current disclosure.

FIG. 7 illustrates example embodiments for inter-NG RAN node N2 based handover, according to some embodiments of the current disclosure.

0. MB Media stream and PTM/PTP transmission may be ongoing in the 5GS i.e., from MB-UPF to S-RAN to UE.

1. S-RAN to S-AMF: Handover Required (Target ID, Source to Target transparent container, SM N2 info list, PDU Session IDs, intra system handover indication).

Source to Target transparent container includes NG-RAN information created by S-RAN to be used by T-RAN, and is transparent to 5GC.

2. T-AMF Selection: When the S-AMF can't serve the UE anymore, the S-AMF selects the T-AMF as described in clause 6.3.5 on "AMF Selection Function" in TS 23.501 (see, 3GPP 23.501 V16.4.0 5G system architecture, hereinafter [2]).

3.[Conditional] S-AMF to T-AMF: Namf_Communication_CreateUEContext Request (N2 Information (Target ID, Source to Target transparent container, SM N2 information list, PDU Session IDs), UE context information (SUPI, Service area restriction, Allowed NSSAI for each Access Type if available, Tracing Requirements, LTE M Indication, the list of PDU Session IDs along with the corresponding SMF information and the corresponding S-NSSAI(s), PCF ID(s), DNN, UE Radio Capability ID and UE Radio Capability Information). If the subscription information includes Tracing Requirements, the old AMF provides the target AMF with Tracing Requirements.

In inter PLMN mobility case, UE context information includes HPLMN S-NSSAIs corresponding to the Allowed NSSAI for each Access Type, without Allowed NSSAI of source PLMN. The target AMF may determine the Allowed NSSAI based on the HPLMN S-NSSAIs received in step 3, or else the target AMF queries the NSSF by invoking Nnssf_NSSelection_Get service operation with the HPLMN S-NSSAIs and PLMN ID of SUPI. The target AMF may trigger AMF re-allocation when Mobility Registration Update is performed during the Handover execution phase as described in clause 4.2.2.2.3.

The S-AMF initiates Handover resource allocation procedure by invoking the Namf_Communication_CreateUEContext service operation towards the T-AMF.

When the S-AMF can still serve the UE, this step and step 12 are not needed.

If Service area restrictions are available in the S-AMF, they may be forwarded to the T-AMF as described in clause 5.3.4.1.2 in TS 23.501 [2].

If both Home and Visited PCF ID(s) are provided by the S-AMF, the T-AMF contacts the (V-) PCF identified by the (V-)PCF ID. If the (V-)PCF identified by the (V-) PCF ID is not used or there are no PCF ID(s) received from the S-AMF, the T-AMF may select the PCF(s) as described in TS 23.501 [2], clause 6.3.7.1 and according to the V-NRF to H-NRF interaction described in clause 4.3.2.2.3.3. The T-AMF informs the S-AMF that the PCF ID is not used, as defined in step 12 and then the S-AMF terminates the AM Policy Association with the PCF identified by the PCF ID.

4-7. [Conditional] T-AMF to SMF: Nsmf_PDUSession_UpdateSMContext (PDU Session ID, Target ID, T-AMF ID, N2 SM Information).

7a. [Conditional] For each TMGI in the AMF UE Context: T-AMF to MB-SMF: Nmbsmf_MBSession_UpdateMBContext (TMGI, T-AMF ID).

The MB-SMF stores the T-AMF ID in the list of AMF IDs in the MB-SMF MB Session Context. If the T-AMF is new in the list, i.e., the T-AMF does not already have the MB Session and the MB-SMF MB Session state is 'active', the MB-SMF prepares to send a MB Session Start notification to the AMF (step 7c).

7b. MB-SMF to T-AMF: Nmbsmf_MBSession_UpdateMBContext Response (TMGI).

The MB-SMF includes in the Nmbsmf_MBSession_UpdateMBContext response the N2 MB Information containing the Lower Layer Multicast Address (LL MC) assigned for the MB Session and used by the MB-UPF and the 5G Authorized QoS Profile indicating that the N2 SM Information is for the Target NG-RAN. In some embodiments, the T-AMF creates an MB Session Context at sets its state to 'inactive'.

7c. If the T-AMF is new in the MB-SMF list in step 7a and the MB Session is 'active', the MB-SMF sends a Nmbsmf_MBSession_UpdateMBContext Start (i.e., MB Session Start) to the AMF. T-AMF updates its MB Session Context and sets the state to 'active'.

7d-7f. The T-AMF sends a MB Session Resource Setup Request message to T-NG-RAN. See the MB Session Start procedure. A Handover Incoming Indicator is included in the MB Session Resource Setup Request message to avoid that NG-RAN releases resources as there might be no UE interested in that TMGI at this point in time.

8. AMF supervises the Nsmf_PDUSession_UpdateSMContext Response messages from the involved SMFs. The lowest value of the Max delay indications for the PDU Sessions that are candidates for handover gives the maximum time AMF may wait for Nsmf_PDUSession_UpdateSMContext Response messages before continuing with the N2 Handover procedure. At expiry of the maximum wait time or when all Nsmf_PDUSession_UpdateSMContext Response messages are received, AMF continues with the N2 Handover procedure (Handover Request message in step 9). For UE which has joined one or more MB Sessions, the T-AMF does not need to wait for the Nmbsmf_MBSession_UpdateMBContext Response, since these can be executed in parallel with the N2 Handover procedure.

In some embodiments, the delay value for each PDU Session is locally configured in the AMF and implementation specific.

9. T-AMF to T-RAN: Handover Request (Source to Target transparent container, N2 MM Information, N2 SM Information list, Tracing Requirements, UE Radio Capability ID). If the subscription information includes Tracing Requirements, the target AMF provides the target RAN with Tracing Requirements in the Handover Request.

T-AMF determines T-RAN based on Target ID. T-AMF may allocate a 5G-GUTI valid for the UE in the AMF and target TAI.

Source to Target transparent container is forwarded as received from S-RAN. N2 MM Information includes e.g., security information and Mobility Restriction List if available in the T-AMF.

N2 SM Information list includes N2 SM Information received from SMFs for the T-RAN in the Nsmf_PDUSession_UpdateSMContext Response messages received within allowed max delay supervised by the T-AMF mentioned in step 8.

Mobility Restriction List is sent in N2 MM Information if available in the Target AMF.

If the UE Radio Capability ID is included in the Handover Request message, when there is no corresponding UE radio capabilities set for UE Radio Capability ID at T-RAN, T-RAN shall request the T-AMF to provide the UE radio capabilities set corresponding to UE Radio Capability ID to the T-RAN.

10. T-RAN to T-AMF: Handover Request Acknowledge (Target to Source transparent container, List of PDU Sessions to Hand-over with N2 SM information, List of PDU Sessions that failed to be established with the failure cause given in the N2 SM information element).

Target to Source transparent container includes a UE container with an access stratum part and a NAS part. The UE container is sent transparently via T-AMF, S-AMF, and S-RAN to the UE.

T-RAN creates List Of PDU Sessions failed to be setup and reason for failure (e.g., T-RAN decision, S-NSSAI is not available, unable to fulfill User Plane Security Enforcement) based on T-RAN determination. The information is provided to the S-RAN.

The N2 SM information in the List Of PDU Sessions to Hand-over, contains per each PDU Session ID T-RAN N3 addressing information i.e., N3 UP address and Tunnel ID of T-RAN for the PDU Session.

If redundant transmission is performed for one or more QoS Flows of the PDU Session, the T-RAN provides two AN Tunnel Info for the PDU Session in the N2 SM information. The T-RAN indicates to the SMF one of the AN Tunnel Info is used as the redundancy tunnel of the PDU session as described in clause 5.33.2.2 of TS 23.501 [2]. If only one AN Tunnel Info is provided by the Target NG-RAN for the PDU session, the SMF may release these QoS Flows by triggering PDU Session Modification procedure as specified in clause 4.3.3 after the handover procedure.

The N2 SM information may also include: —an Indication whether UP integrity protection is performed or not on the PDU Session. —if the PDU Session has at least one QoS Flow subject for data forwarding, N3 UP address and Tunnel ID of T-RAN for receiving forwarded data. The T-RAN provides data forwarding addresses for each data forwarding tunnel which it decided to setup. —For each QoS Flow accepted with an Alternative QoS Profile (see TS 23.501 [2]), the Target NG-RAN shall include a reference to the fulfilled Alternative QoS Profile.

11a-f. AMF to SMF: Nsmf_PDUSession_UpdateSMContext Request.

12. [Conditional] T-AMF to S-AMF: Namf_Communication_CreateUEContext Response (N2 information necessary for S-AMF to send Handover Command to S-RAN including Target to Source transparent container, PDU Sessions failed to be setup list, N2 SM information (N3 DL forwarding Information, PCF ID)).

AMF supervises the Nsmf_PDUSession_UpdateSMContext Response message from the involved SMFs. At expiry of the maximum wait time or when all Nsmf_PDUSession_UpdateSMContext Response messages are received, T-AMF sends the Namf_Communication_CreateUEContext Response to the S-AMF.

The PDU Sessions failed to be setup list includes the List Of PDU Sessions failed to be setup received from target RAN in step 10 and the Non-accepted PDU session List generated by the T-AMF.

Non-accepted PDU Session List includes following PDU Session(s) with proper cause value:
  Non-accepted PDU Session(s) by the SMF(s);
  Non-accepted PDU Session(s) by the AMF due to no response from the SMF within maximum wait time; and
  Non-accepted PDU Session(s) by the AMF due to non-available S-NSSAI in the T-AMF, which is decided at step 4.

The Target to Source transport container is received from the T-RAN. The N2 SM Information is received from the SMF in step 11f.

Execution Phase

Figure 8:
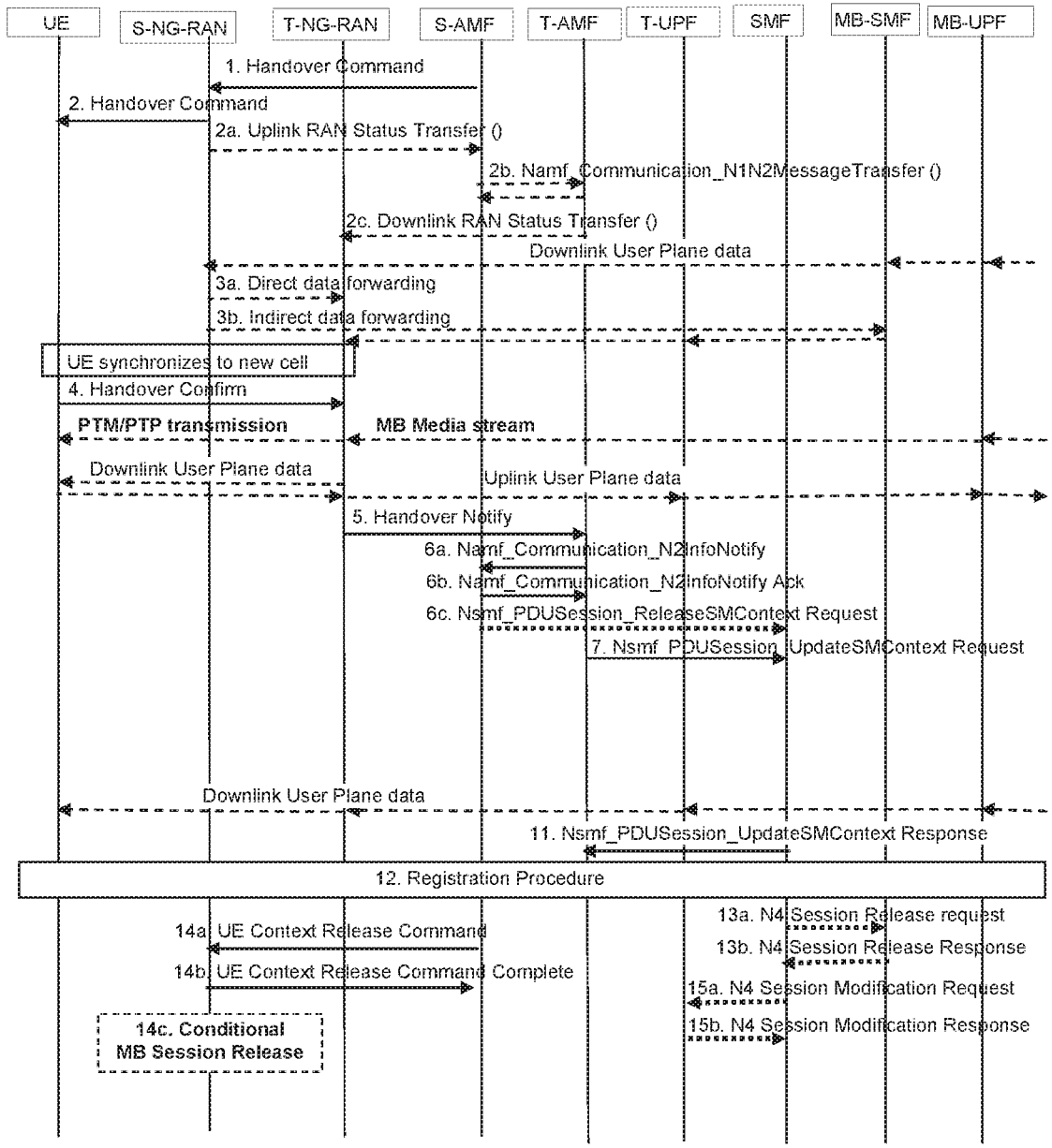
FIG. 8 illustrates example embodiments for inter-NG RAN node N2 based handover, according to some embodiments of the current disclosure.

FIG. 8 illustrates example embodiments for inter-NG RAN node N2 based handover, according to some embodiments of the current disclosure. Registration of serving AMF with the UDM is not shown in the figure for brevity.

1. S-AMF to S-RAN: Handover Command (Target to Source transparent container, List Of PDU Sessions to be handed-over with N2 SM information containing information received from T-RAN during the handover preparation phase, List Of PDU Sessions failed to be setup).

Target to Source transparent container is forwarded as received from S-AMF.

The SM forwarding info list includes T-RAN SM N3 forwarding info list for direct forwarding or S-UPF SM N3 forwarding info list for indirect data forwarding S-RAN uses the PDU Sessions failed to be setup list and the indicated reason for failure to decide whether to proceed with the N2 Handover procedure.

If the S-RAN receives a reference to an Alternative QoS Profile for an accepted QoS Flow, it shall take it into account for deciding whether or not to proceed with the N2 Handover procedure (see TS 23.501 [2]).

2. S-RAN to UE: Handover Command (UE container).

UE container is a UE part of the Target to Source transparent container which is sent transparently from T-RAN via AMF to S-RAN and is provided to the UE by the S-RAN.

2a0. If the PLMN has configured secondary RAT usage reporting and the source NG-RAN has Secondary RAT usage data to report, the source NG-RAN node may provide RAN usage data report message (N2 SM Information (Secondary RAT usage data), Handover Flag) as in clause 4.21 to the AMF. The Handover Flag indicates to the AMF that it should buffer the N2 SM Information containing the usage data report before forwarding it.

This step is not shown in this figure but the secondary RAT usage data reporting procedure is shown in FIGS. 4.21-1 in clause 4.21.

2a.-2c. The S-RAN sends the Uplink RAN Status Transfer message to the S-AMF, as specified in TS 36.300 [46] and TS 38.300 [9]. The S-RAN may omit sending this message if none of the radio bearers of the UE shall be treated with PDCP status preservation.

If there is an AMF relocation, the S-AMF sends this information to the T-AMF via the Namf_Communication_N1N2MessageTransfer service operation and the T-AMF acknowledges. The S-AMF or, if the AMF is relocated, the T-AMF, sends the information to the T-RAN via the Downlink RAN Status Transfer message, as specified in TS 36.300 [46] and TS 38.300 [9].

3. Uplink packets are sent from T-RAN to T-UPF and UPF (PSA). Downlink packets are sent from UPF (PSA) to S-RAN via S-UPF. The S-RAN should start forwarding of downlink data from the S-RAN towards the T-RAN for QoS Flows or DRBs subject to data forwarding. This may be either direct (step 3a) or indirect forwarding (step 3b).

4. UE to T-RAN: Handover Confirm.

After the UE has successfully synchronized to the target cell, it sends a Handover Confirm message to the T-RAN. Handover is by this message considered as successful by the UE. If there is MB Session Ctxt in active state in T-NG-RAN for any of the TMGI(s) of the new UE, the T-NG-RAN provides PTM/PTP transmission(s) to the new UE.

5. T-RAN to T-AMF: Handover Notify.

Handover is by this message considered as successful in T-RAN.

For each QoS Flow accepted with an Alternative QoS Profile (see TS 23.501 [2]), the Target-RAN shall send to the SMF a reference to the fulfilled Alternative QoS Profile.

6a. [Conditional] T-AMF to S-AMF: Namf_Communication_N2InfoNotify.

The T-AMF notifies to the S-AMF about the N2 handover notify received from the T-RAN by invoking the Namf_Communication_N2InfoNotify.

A timer in S-AMF is started to supervise when resources in S-RAN shall be release.

6b. [Conditional] S-AMF to T-AMF: Namf_Communication_N2InfoNotify ACK (N2 SM Information (Secondary RAT usage data)).

The S-AMF acknowledges by sending the Namf_Communication_N2InfoNotify ACK to the T-AMF. The N2 SM Information here is the one buffered at step 2a0 when applicable.

6c. [Conditional] S-AMF to SMF: Nsmf_PDUSession_ReleaseSMContext Request (SUPI, PDU Session ID, N2 SM Information (Secondary RAT Usage Data)).

If the PDU Session(s) is not accepted by the T-AMF (e.g., S-NSSAI associated with the PDU Session is not available in the T-AMF), S-AMF triggers PDU Session Release procedure as specified in clause 4.3.4.2 after the S-AMF is notified for the reception of N2 Handover Notify in step 6a.

7. T-AMF to SMF: Nsmf_PDUSession_UpdateSMContext Request (Handover Complete indication for PDU Session ID, UE presence in LADN service area, N2 SM Information (Secondary RAT usage data)). The N2 SM Information here is the one received at step 6b when applicable.

Handover Complete indication is sent per each PDU Session to the corresponding SMF to indicate the success of the N2 Handover.

When an Nsmf_PDUSession_UpdateSMContext Response message arrived too late during the handover preparation phase (see step 8 of clause 4.9.1.3.2), or the PDU Session with SMF involvement is not accepted by T-RAN, Nsmf_PDUSession_UpdateSMContext Request (SUPI, PDU Session ID, Operation Type) is sent to the corresponding SMF allowing the SMF to deallocate a possibly allocated N3 UP address and Tunnel ID of the selected UPF. A PDU Session handled by that SMF is considered deactivated and handover attempt is terminated for that PDU Session.

In the case that the AMF determines that the PDU Session is related to a LADN then the AMF provides the "UE presence in LADN service area". If the AMF does not provide the "UE presence in LADN service area" indication and the SMF determines that the DNN corresponds to a LADN, then the SMF considers that the UE is OUT of the LADN service area.

The SMF takes actions for the LADN PDU Session as defined in TS 23.501 [2] clause 5.6.5 based on the "UE presence in LADN service area" indication.

For each QoS Flow for which the SMF has received a reference to the fulfilled Alternative QoS Profile, the SMF notifies the PCF and the UE as described in TS 23.501 [2].

8a. [Conditional] SMF to T-UPF (intermediate): N4 Session Modification Request.

If new T-UPF is inserted or an existing intermediate S-UPF is re-allocated, the SMF shall send N4 Session Modification Request indicating DL AN Tunnel Info of T-RAN to the T-UPF.

8b. [Conditional] T-UPF to SMF: N4 Session Modification Response.

The T-UPF acknowledges by sending N4 Session Modification Response message to SMF.

9a. [Conditional] SMF to S-UPF (intermediate): N4 Session Modification Request.

If UPF is not re-allocated, the SMF shall send N4 Session Modification Request indicating DL AN Tunnel Info of T-RAN to the S-UPF.

9b. [Conditional] S-UPF to SMF: N4 Session Modification Response. In some embodiments, the S-UPF acknowledges by sending N4 Session Modification Response message to SMF.

10a. [Conditional] SMF to UPF (PSA): N4 Session Modification Request.

For non-roaming or local breakout roaming scenario, the SMF sends N4 Session Modification Request message to PDU Session Anchor UPF, UPF (PSA), providing N3 AN Tunnel Info of T-RAN or the DL CN Tunnel Info of T-UPF if a new T-UPF is inserted or an existing intermediate S-UPF is re-allocated. If redundant transmission is performed for one or more QoS Flows of the PDU Session, two N3 AN Tunnel Info of T-RAN or two DL CN Tunnel Info of two T-UPFs are provided and the SMF indicates to the UPF (PSA) one of the AN/CN Tunnel Info is used as redundancy tunnel of the PDU Session. If the existing intermediate S-UPF terminating to N9 toward the H-UPF (PDU Session Anchor) is re-allocated for the home routed roaming scenario, the V-SMF invokes an Nsmf_PDUSession_Update Request (End Marker Indication) service operation toward the H-SMF. The End Marker Indication is used to indicate that End Marker(s) is to be sent.

In case of the S-UPF acts as a UL CL or BP, the SMF indicates only one of the PDU Session Anchors to send the "end marker" packets. To ensure the "end marker" is the last user plane packet on the old path, the SMF should modify the path on other PDU Session Anchors before it indicates the PDU Session Anchor to send the "end marker" packets.

If T-UPF is not inserted or an existing intermediate S-UPF is not re-allocated, step 10a and step 10b are skipped.

10b. [Conditional] UPF (PSA) to SMF: N4 Session Modification Response.

The UPF (PSA) sends N4 Session Modification Response message to SMF. In order to assist the reordering function in the T-RAN, the UPF (PSA) sends one or more "end marker" packets for each N3 tunnel on the old path immediately after switching the path, the source NG-RAN shall forward the "end marker" packets to the target NG-RAN. At this point, UPF (PSA) starts sending downlink packets to the T-RAN, via T-UPF if a new T-UPF is inserted or an existing intermediate S-UPF is re-allocated. In case of home routed roaming scenario, the H-SMF responds with the Nsmf_PDUSession_Update Response service operation to V-SMF once the H-UPF (PDU Session Anchor) is updated with the UL Tunnel Info of the T-UPF.

When there are multiple UPFs (PSA), step 10a and step 10b are performed for each UPFs (PSA).

11. SMF to T-AMF: Nsmf_PDUSession_UpdateSMContext Response (PDU Session ID).

SMF confirms reception of Handover Complete.

If indirect data forwarding applies, the SMF starts an indirect data forwarding timer, to be used to release the resource of indirect data forwarding tunnel.

12. The UE initiates Mobility Registration Update procedure as described in clause 4.2.2.2.2.

The target AMF knows that it is a Handover procedure and therefore the target AMF performs only a subset of the Registration procedure, specifically the steps 4, 5, and 10 in the Registration procedure for the context transfer between source AMF and target AMF are skipped.

13a. [Conditional] SMF to S-UPF (intermediate): N4 Session Release Request.

If there is a source intermediate UPF, the SMF initiates resource release, after timer in step 6 or indirect data forwarding timer expires, by sending an N4 Session Release Request (Release Cause) to source UPF. This message is also used to release the indirect data forwarding resource in S-UPF.

13b. S-UPF to SMF: N4 Session Release Response.

The S-UPF acknowledges with an N4 Session Release Response message to confirm the release of resources.

In case of indirect data forwarding, the resource of indirect data forwarding is also released.

14a. AMF to S-RAN: UE Context Release Command ( ).

After the timer in step 6a expires, the AMF sends UE Context Release Command.

14b. S-RAN to AMF: UE Context Release Complete ( ).

The source NG-RAN releases its resources related to the UE and responds with a UE Context Release Complete 0 message.

14c. [Conditional] If this UE was the last UE to leave a MB Session in the S-NG-RAN, the S-NG-RAN releases its resources for the MB Session (see Session Leave procedure).

15a. [Conditional] SMF to T-UPF: N4 Session Modification Request.

If indirect forwarding applies and UPF is re-allocated, after timer of indirect data forwarding expires, the SMF sends N4 Session Modification Request to T-UPF to release the indirect data forwarding resource.

15b. [Conditional] T-UPF to SMF: N4 Session Modification Response.

The T-UPF acknowledges with an N4 Session Modification Response message to confirm the release of indirect data forwarding resources.

If the AMF is subscribed to Mobility Event by other NFs, the AMF notifies the event to the corresponding NFs by invoking the Namf_EventExposure_Notify service operation as described in clause 4.15.4.2.

Upon reception of the Namf_EventExposure_Notify with an indication that UE is reachable only for regulatory prioritized service, the SMF deactivates the PDU Session if the service of the PDU Session is not regulatory prioritized. For home routed roaming case, the V-SMF triggers the deactivation of the PDU Session, in addition, the H-SMF refrains from sending downlink signaling if the signaling is not related to regulatory prioritized service upon receiving the notification.

In some embodiments, impacts on services, entities and interfaces might include one or more of:
- UE: —Reception of multicast data using PTM/PTP in RRC Connected. —Switch of reception from Source to Target NG-RAN when N2 Handover execution phase commences.
- NG-RAN: —MB Session resource setup during N2 Handover preparation phase. —Reception of MB Media streams. —Forwarding of MB Media streams using PTM/PTP transmission to UE when N2 Handover execution phase commences.
- AMF: —Triggering MB Session Join and MB Session Start signaling for resource setup during N2 Handover preparation phase.

In this way, some embodiments provide support for Multicast Broadcast Session continuity (aka "Handover") at Inter-gNB Xn Handover and Inter-gNB N2 Handover in the 5G NR radio access.

Figure 9:
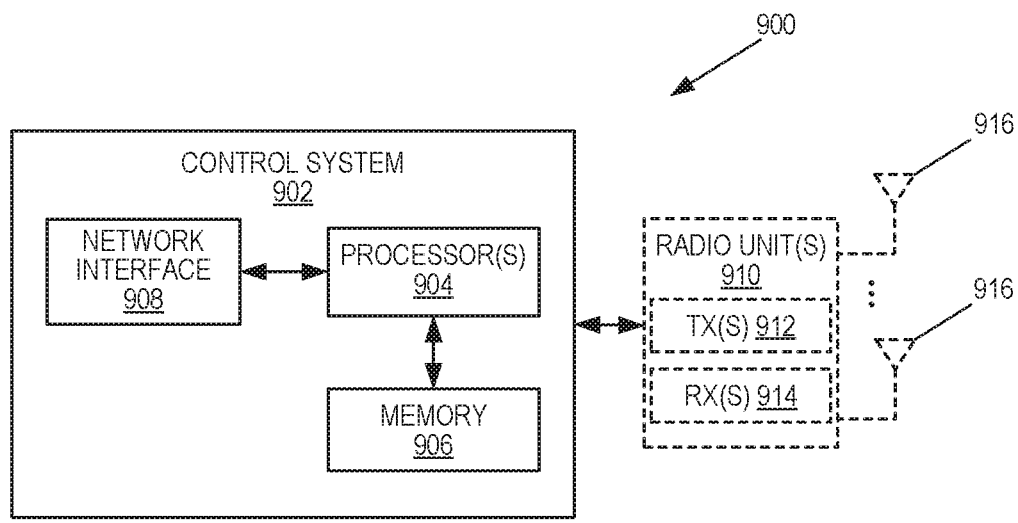
FIG. 9 is a schematic block diagram of a radio access node according to some embodiments of the present disclosure.

FIG. 9 is a schematic block diagram of a radio access node 900 according to some embodiments of the present disclosure. Optional features are represented by dashed boxes. The radio access node 900 may be, for example, a base station 102 or 106 or a network node that implements all or part of the functionality of the base station 102 or gNB described herein. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
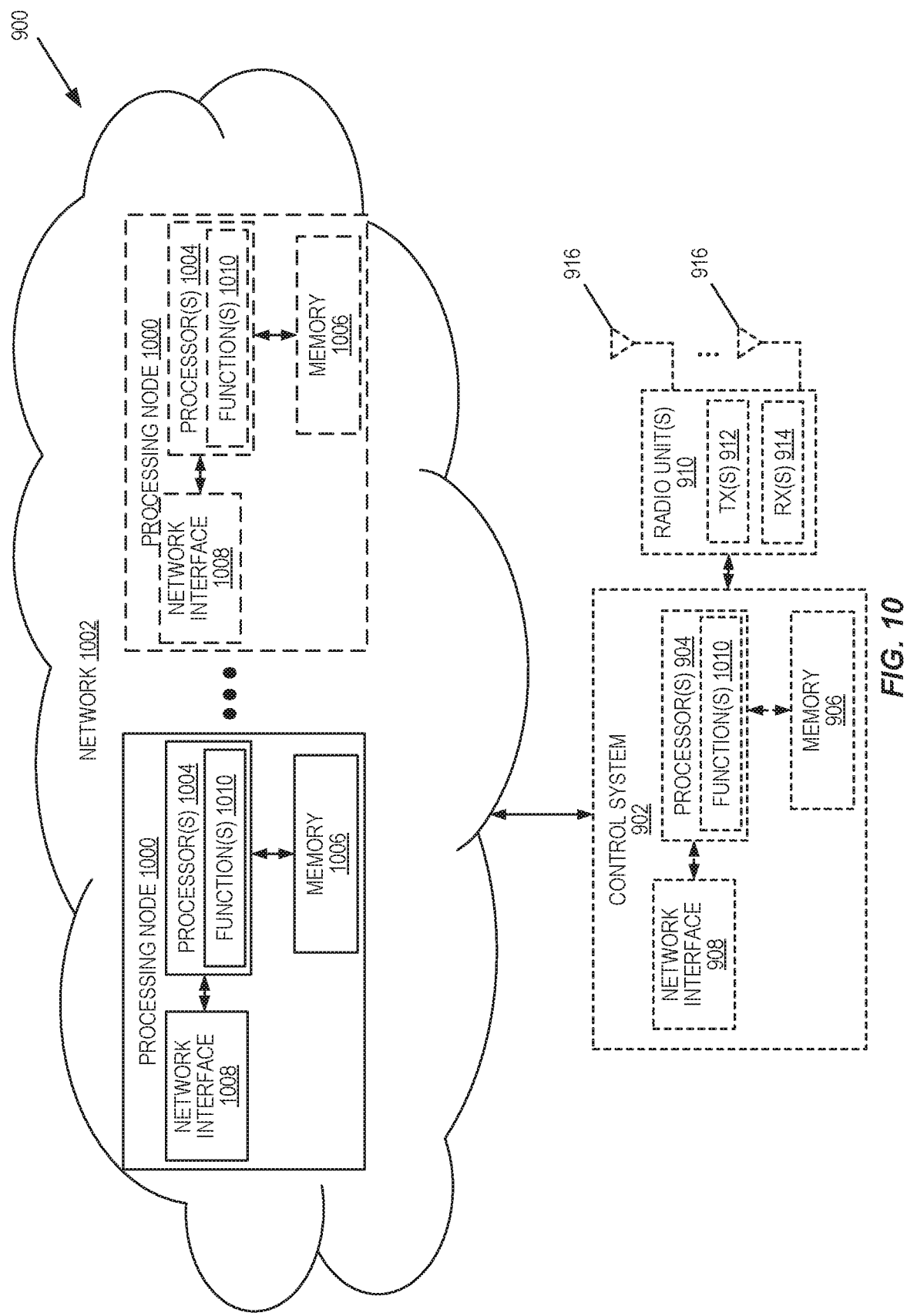
FIG. 10 is a schematic block diagram that illustrates a virtualized embodiment of the radio access node according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 may include the control system 902 and/or the one or more radio units 910, as described above. The control system 902 may be connected to the radio unit(s) 910 via, for example, an optical cable or the like. The radio access node 900 includes one or more processing nodes 1000 coupled to or included as part of a network(s) 1002. If present, the control system 902 or the radio unit(s) are connected to the processing node(s) 1000 via the network 1002. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the one or more processing nodes 1000 and the control system 902 and/or the radio unit(s) 910 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
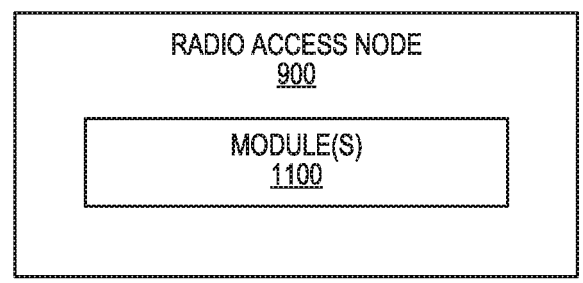
FIG. 11 is a schematic block diagram of the radio access node according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
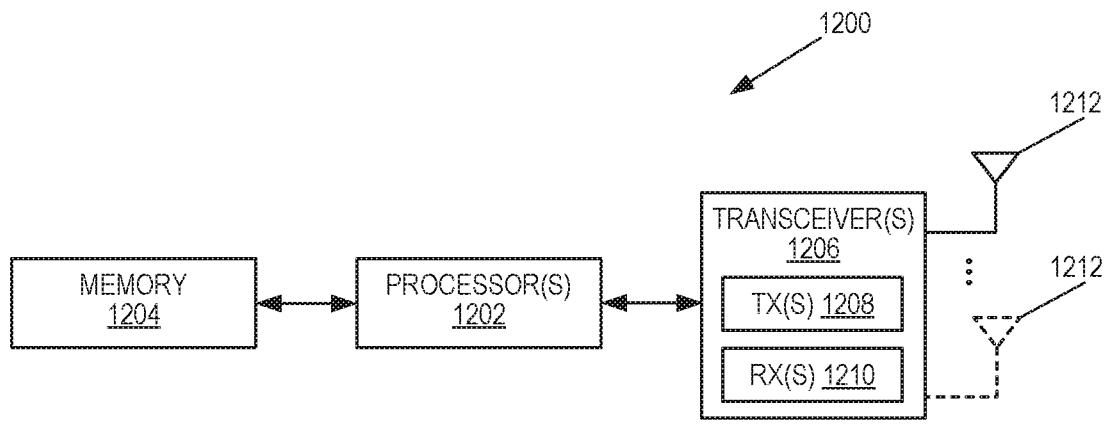
FIG. 12 is a schematic block diagram of a wireless communication device according to some embodiments of the present disclosure.

FIG. 12 is a schematic block diagram of a wireless communication device 1200 according to some embodiments of the present disclosure. As illustrated, the wireless communication device 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the wireless communication device 1200 described above may be fully or partially implemented in software that is, e.g., stored in the memory 1204 and executed by the processor(s) 1202. Note that the wireless communication device 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the wireless communication device 1200 and/or allowing output of information from the wireless communication device 1200), a power supply (e.g., a battery and associated power circuitry), etc.

In some embodiments, a computer program including instructions which, when executed by at least one processor, causes the at least one processor to carry out the functionality of the wireless communication device 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
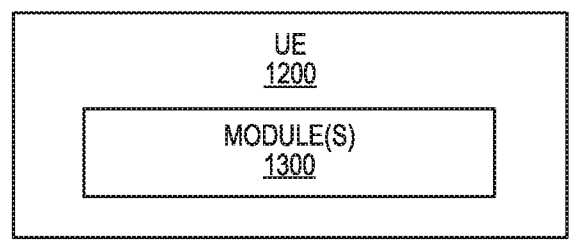
FIG. 13 is a schematic block diagram of the wireless communication device 1200 according to some other embodiments of the present disclosure.

FIG. 13 is a schematic block diagram of the wireless communication device 1200 according to some other embodiments of the present disclosure. The wireless communication device 1200 includes one or more modules 1300, each of which is implemented in software. The module(s) 1300 provide the functionality of the wireless communication device 1200 described herein.

Figure 14:
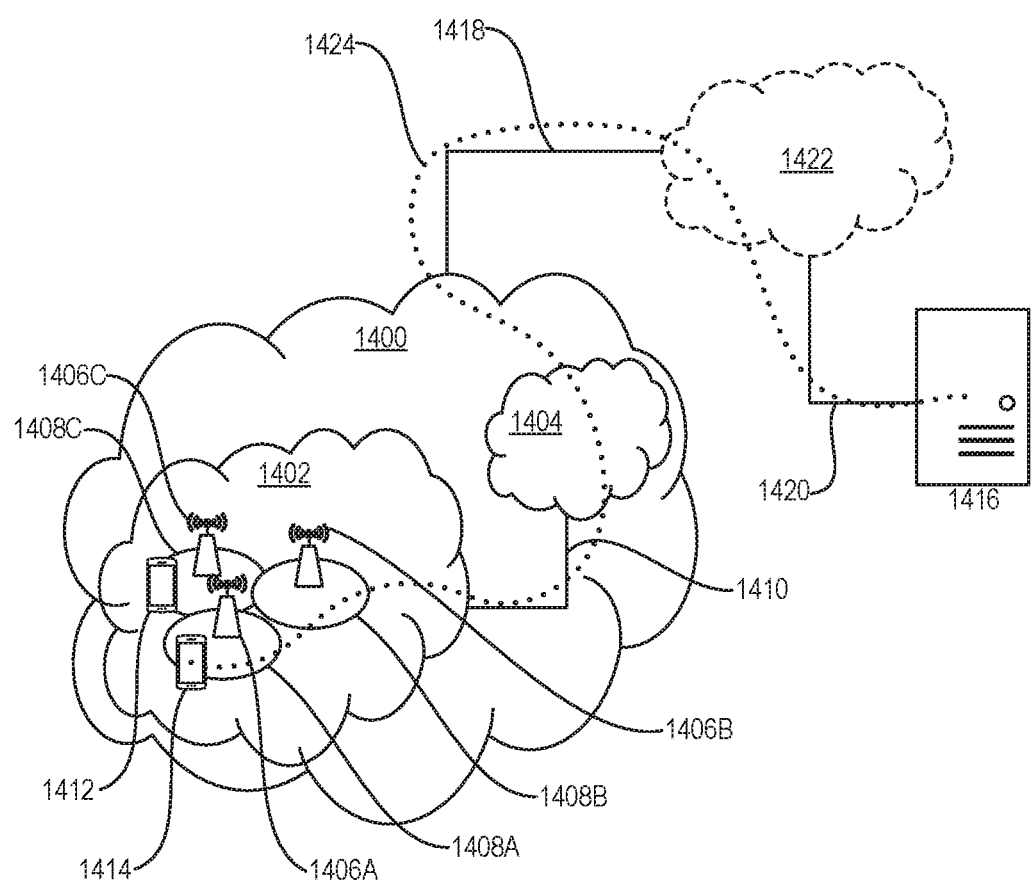
FIG. 14 illustrates a communication system includes a telecommunication network, such as a 3GPP-type cellular network, which comprises an access network, such as a RAN, and a core network according to some embodiments of the present disclosure.

With reference to FIG. 14, in accordance with an embodiment, a F 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
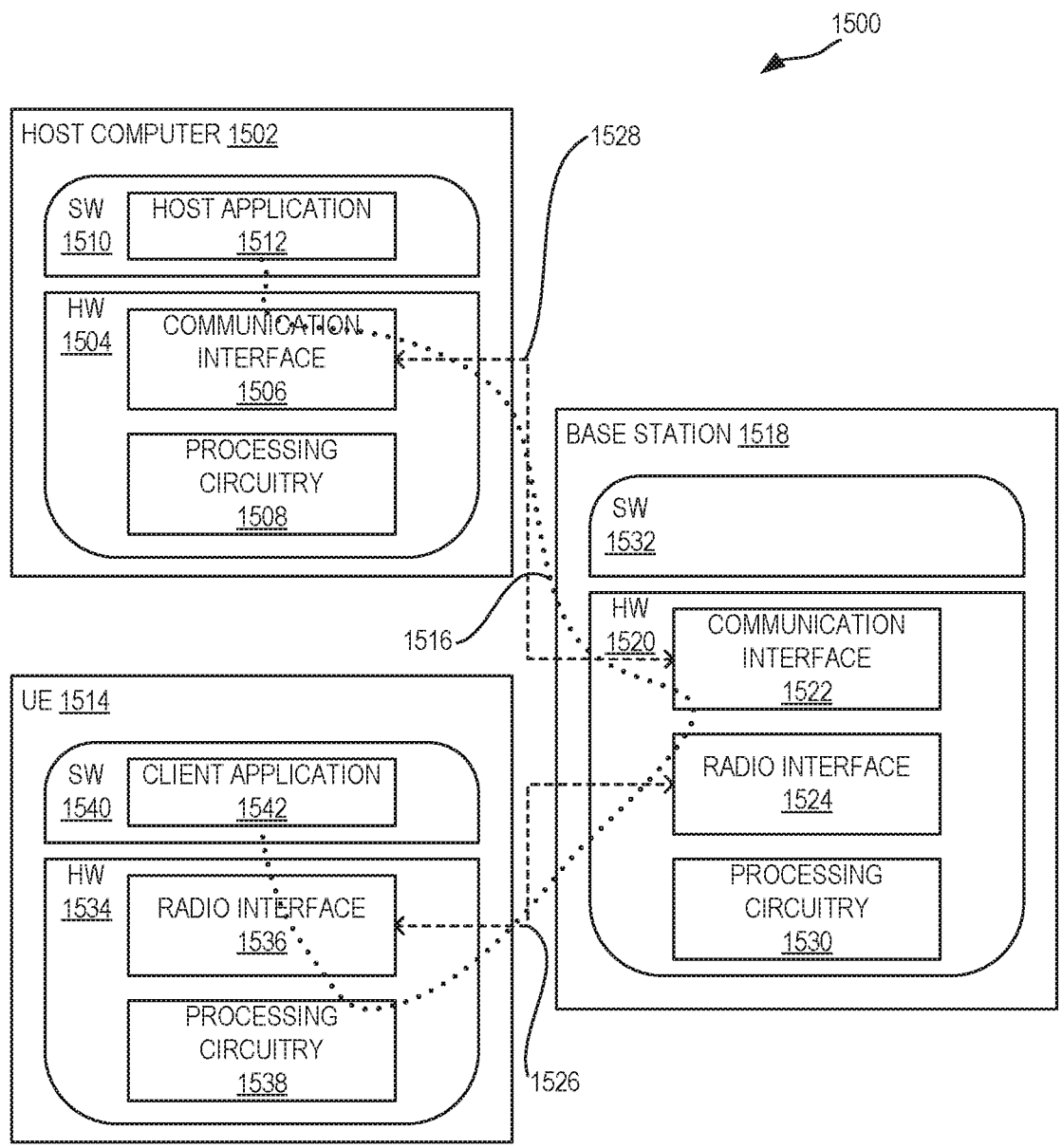
FIG. 15 illustrates a communication system including a host computer according to some embodiments of the present disclosure.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for session continuity of MB Sessions, the method comprising at least one of: receiving at least one MB Session while connected in 5G; being handed over to a target NG-RAN; and continuing to receive the at least one MB Session.

Embodiment 2: The method of embodiment 1 wherein being handed over to the target NG-RAN comprises an Xn handover.

Embodiment 3: The method of embodiment 1 wherein being handed over to the target NG-RAN comprises a N2 handover.

Embodiment 4: The method of any of embodiments 1 to 3 wherein the hand over includes any of the features described in the Group B Embodiments.

Embodiment 5: The method of any of the previous embodiments, further comprising: providing user data; and forwarding the user data to a host computer via the transmission to the base station.

Group B Embodiments

Embodiment 6: A method performed by a base station for session continuity of MB Sessions, the method comprising at least one of: providing at least one MB Session to a wireless device connected in 5G; determining that the wireless device is handed over to a target NG-RAN; and providing session continuity of the at least one MB Session to the wireless device.

Embodiment 7: A method performed by a base station for session continuity of MB Sessions, the method comprising at least one of: receiving a handed over wireless device that was receiving at least one MB Session; and providing session continuity of the at least one MB Session to the wireless device.

Embodiment 8: The method of any of embodiments 6 to 7 wherein the hand over to the target NG-RAN comprises an Xn handover.

Embodiment 9: The method of embodiment 8 further comprising causing resources to be established in the Target NG-RAN in the Xn Handover preparation phase.

Embodiment 10: The method of any of embodiments 8 to 9 further comprising causing resources to be established in the Target NG-RAN in the Xn Handover execution phase.

Embodiment 11: The method of any of embodiments 8 to 10 further comprising notifying and/or triggering an AMF to start setup of MB Session resources in the NG-RAN.

Embodiment 12: The method of embodiment 11 wherein the notifying and/or triggering comprises a MB Session Command.

Embodiment 13: The method of embodiment 11 wherein the notifying and/or triggering comprises new parameters to an existing Path Switching Request and/or Path Switching Request Acknowledgement messages.

Embodiment 14: The method of any of embodiments 8 to 13 wherein a new parameter "TMGIs" (or TMGI-list) is included in the existing Path Switch Request message.

Embodiment 15: The method of any of embodiments 6 to 7 wherein the hand over to the target NG-RAN comprises a N2 handover.

Embodiment 16: The method of embodiment 15 further comprising causing resources to be established in the Target NG-RAN in the N2 Handover preparation phase.

Embodiment 17: The method of any of embodiments 1 to 16 further comprising releasing resources if this was the last wireless device leaving that MB Session.

Embodiment 18: The method of any of the previous embodiments, further comprising: obtaining user data; and forwarding the user data to a host computer or a wireless device.

Group C Embodiments

Embodiment 19: A wireless device for session continuity of MB Sessions, the wireless device comprising: processing circuitry configured to perform any of the steps of any of the Group A embodiments; and power supply circuitry configured to supply power to the wireless device.

Embodiment 20: A base station for session continuity of MB Sessions, the base station comprising: processing circuitry configured to perform any of the steps of any of the Group B embodiments; and power supply circuitry configured to supply power to the base station.

Embodiment 21: A User Equipment, UE, for session continuity of MB Sessions, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 22: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 23: The communication system of the previous embodiment further including the base station.

Embodiment 24: The communication system of the previous 2 embodiments, further including the UE, wherein the UE is configured to communicate with the base station.

Embodiment 25: The communication system of the previous 3 embodiments, wherein: the processing circuitry of the host computer is configured to execute a host application, thereby providing the user data; and the UE comprises processing circuitry configured to execute a client application associated with the host application.

Embodiment 26: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 27: The method of the previous embodiment, further comprising, at the base station, transmitting the user data.

Embodiment 28: The method of the previous 2 embodiments, wherein the user data is provided at the host computer by executing a host application, the method further comprising, at the UE, executing a client application associated with the host application.

Embodiment 29: A User Equipment, UE, configured to communicate with a base station, the UE comprising a radio interface and processing circuitry configured to perform the method of the previous 3 embodiments.

Embodiment 30: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 31: The communication system of the previous embodiment, wherein the cellular network further includes a base station configured to communicate with the UE.

Embodiment 32: The communication system of the previous 2 embodiments, wherein: the processing circuitry of the host computer is configured to execute a host application, thereby providing the user data; and the UE's processing circuitry is configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 34: The method of the previous embodiment, further comprising at the UE, receiving the user data from the base station.

Embodiment 35: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 36: The communication system of the previous embodiment, further including the UE.

Embodiment 37: The communication system of the previous 2 embodiments, further including the base station, wherein the base station comprises a radio interface configured to communicate with the UE and a communication interface configured to forward to the host computer the user data carried by a transmission from the UE to the base station.

Embodiment 38: The communication system of the previous 3 embodiments, wherein: the processing circuitry of the host computer is configured to execute a host application; and the UE's processing circuitry is configured to execute a client application associated with the host application, thereby providing the user data.

Embodiment 39: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 40: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 41: The method of the previous embodiment, further comprising, at the UE, providing the user data to the base station.

Embodiment 42: The method of the previous 2 embodiments, further comprising: at the UE, executing a client application, thereby providing the user data to be transmitted; and at the host computer, executing a host application associated with the client application.

Embodiment 43: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 44: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 45: The communication system of the previous embodiment further including the base station.

Embodiment 46: The communication system of the previous 2 embodiments, further including the UE, wherein the UE is configured to communicate with the base station.

Embodiment 47: The communication system of the previous 3 embodiments, wherein: the processing circuitry of the host computer is configured to execute a host application; and the UE is configured to execute a client application associated with the host application, thereby providing the user data to be received by the host computer.

Embodiment 48: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 49: The method of the previous embodiment, further comprising at the base station, receiving the user data from the UE.

Embodiment 50: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eMBMS Evolved Multicast/Broadcast Multimedia Subsystem
eNB Enhanced or Evolved Node B
EPS Evolved Packet System E-UTRA Evolved Universal Terrestrial Radio Access
FPGA Field Programmable Gate Array
gNB New Radio Base Station
gNB-CU gNB Central Unit
gNB-DU New Radio Base Station Distributed Unit
HSS Home Subscriber Server
IoT Internet of Things
IP Internet Protocol
LTE Long Term Evolution
MB Multiband Broadcast
MBMS Multicast/Broadcast Multimedia Subsystem
MME Mobility Management Entity
MTC Machine Type Communication
NEF Network Exposure Function
NF Network Function
NGAP Next Generation Application Protocol
NG-RAN Next Generation Radio Access Network
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRC Radio Resource Control
RRH Remote Radio Head
RTT Round Trip Time
SCEF Service Capability Exposure Function
SMF Session Management Function
TMGI Temporary Mobile Group Identity
UDM Unified Data Management
UE User Equipment
UPF User Plane Function
V2X Vehicle to Everything Those skilled in the art will recognize improvements and modifications to the embodiments of the present disclosure. All such improvements and modifications are considered within the scope of the concepts disclosed herein.

The invention claimed is:

1. A method performed by at least one wireless device participating in/that joined a Multicast Broadcast, MB, session for session continuity of the MB Session, the method comprising:
receiving, from a source Next Generation Radio Access Network, NG-RAN, at least one MB Session data while connected in 5G associated to a Temporary Mobile Group Identity, TMGI;
receiving an instruction to handover to a target cell in a target NG-RAN node where context for the MB session associated to the TMGI already exists being handed over to a target NG RAN; and
continuing to receive data of the at least one MB Session associated to the same TMGI via the target NG-RAN as soon as the UE switches to the target cell if context associated with the at least one MB session is active at the target NG RAN.

2. The method of claim 1 wherein being handed over the handover to the target NG-RAN comprises an Xn handover.

3. The method of claim 1 wherein being handed over the handover to the target NG-RAN comprises an N2 handover.

4. The method of claim 3 further comprising causing resources to be established in the target NG-RAN in an N2 Handover preparation phase.

5. A method performed by a Next Generation Radio Access Network, NG-RAN, node for session continuity of a Multicast Broadcast, MB, Session, the method comprising:
providing at least one MB Session data, from an MB-User Plane Function, UPF, to one or more wireless devices connected in 5G associated to a Temporary Mobile Group Identity, TMGI;
determining that at least one of the one or more wireless devices is handed over to a target NG-RAN node; and
handing over the at least one of the one or more the wireless devices and the at least one MB session associated to the TMGI to the target NG-RAN node;
upon determining the at least one of the one or more wireless devices is a last wireless device to leave the at least one MB session in the NG-RAN node as a result of the handover, releasing corresponding resources of the at least one MB session.

6. The method of claim 5 wherein being handed over to the target NG-RAN comprises an Xn handover.

7. The method of claim 6 further comprising: causing resources to be established in the target NG-RAN in an Xn Handover preparation phase.

8. The method of claim 6 further comprising: causing resources to be established in the target NG-RAN in an Xn Handover execution phase.

9. The method of claim 6 further comprising: notifying and/or triggering an Access and Mobility Management Function, AMF, to start setup of MB Session resources in the target NG-RAN.

10. The method of claim 9 wherein the notifying and/or triggering comprises an MB Session Command.

11. The method of claim 9 wherein the notifying and/or triggering comprises new parameters to an existing Path Switching Request and/or Path Switching Request Acknowledgement message.

12. The method of claim 6 wherein the TMGI (or TMGI-list) is included in the existing Path Switching Request message.

13. The method of claim 5 wherein being handed over to the target NG-RAN comprises an N2 handover.

14. The method of claim 13 further comprising causing resources to be established in the target NG-RAN in an N2 Handover preparation phase.

15. The method of claim 5 further comprising releasing resources if this was the last wireless device leaving the MB Session.

16. A method performed by a Next Generation Radio Access Network, NG-RAN, node for session continuity of Multicast Broadcast, MB, Sessions, the method comprising:
receiving a handed over wireless device that was receiving at least one MB Session data associated to a Temporary Mobile Group Identity, TMGI from a source Next Generation Radio Access Network, NG-RAN; and
providing the session continuity of the at least one MB Session to the wireless device.

17. The method of claim 16 further comprising releasing resources if this was the last wireless device leaving the MB session.

* * * * *